(12) United States Patent
Kim

(10) Patent No.: US 11,122,532 B2
(45) Date of Patent: Sep. 14, 2021

(54) METHOD FOR TRANSCEIVING SIGNAL IN ASSOCIATION WITH MULTI-HOMING BASED PSA ADDITION IN WIRELESS COMMUNICATION SYSTEM AND APPARATUS THEREFOR

(71) Applicant: LG ELECTRONICS INC., Seoul (KR)

(72) Inventor: Laeyoung Kim, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 0 days.

(21) Appl. No.: 16/618,096

(22) PCT Filed: May 29, 2018

(86) PCT No.: PCT/KR2018/006109
§ 371 (c)(1),
(2) Date: Nov. 27, 2019

(87) PCT Pub. No.: WO2018/221943
PCT Pub. Date: Dec. 6, 2018

(65) Prior Publication Data
US 2020/0154390 A1 May 14, 2020

Related U.S. Application Data

(60) Provisional application No. 62/512,076, filed on May 29, 2017, provisional application No. 62/632,428, filed on Feb. 20, 2018.

(51) Int. Cl.
*H04W 60/00* (2009.01)
*H04L 29/06* (2006.01)
(Continued)

(52) U.S. Cl.
CPC ....... *H04W 60/005* (2013.01); *H04L 65/1016* (2013.01); *H04W 8/26* (2013.01); *H04L 61/6059* (2013.01); *H04L 65/1006* (2013.01)

(58) Field of Classification Search
CPC .. H04W 60/005; H04W 8/26; H04L 65/1016; H04L 65/1006; H04L 61/6059
See application file for complete search history.

(56) References Cited

U.S. PATENT DOCUMENTS

2008/0064398 A1* 3/2008 Zhu ................... H04L 61/1588
455/435.1
2011/0131332 A1 6/2011 Bouazizi
(Continued)

FOREIGN PATENT DOCUMENTS

WO 2016144230 9/2016

OTHER PUBLICATIONS

European patent application No. 2018809307.4, European search report dated Apr. 8, 2020, 8 pages.
(Continued)

*Primary Examiner* — Khai M Nguyen
(74) *Attorney, Agent, or Firm* — Lee, Hong, Degerman, Kang & Waimey

(57) ABSTRACT

An embodiment of the present invention relates to a method for transceiving a signal, by a user equipment (UE), in association with multi-homing based PSA addition in a wireless communication system, the method comprising the steps of: establishing a protocol data unit (PDU) session with a first protocol data unit session anchor (PSA); and receiving a new IP address from a session management function (SMF), wherein when the received new IP address is associated with multi-homing based PSA addition, the UE skips performing IMS registration using the new IP address.

10 Claims, 16 Drawing Sheets

(51) Int. Cl.
  *H04W 8/26* (2009.01)
  *H04L 29/12* (2006.01)

(56) References Cited

U.S. PATENT DOCUMENTS

2018/0270715 A1* 9/2018 Lee .................... H04L 12/4633
2019/0289506 A1* 9/2019 Park .................... H04W 76/27
2019/0327615 A1* 10/2019 Landais .............. H04L 65/1016

OTHER PUBLICATIONS

3rd Generation Partnership Project; Technical Specification Group Services and System Aspects; Procedures for the 5G System; Stage 2 (Release 15), 3GPP TS 23.502 V0.3.0 (Mar. 2017), 116 pages.
3rd Generation Partnership Project; Technical Specification Group Services and System Aspects; Study on S8 Home Routing Architecture for VoLTE; Release 14, 3GPP TR 23.749 V14.0.0 (Jun. 2016), 38 pages.
3rd Generation Partnership Project; Technical Specification Group Services and System Aspects; System Architecture for 5G System; Stage 2, Release 15, 3GPP TS 23.501 V0.4.0 (Apr. 2017), 123 pages.
PCT International Application No. PCT/KR2018/006109, Written Opinion of the International Searching Authority dated Sep. 11, 2018, 24 pages.
Ericsson, "23.502: IPv6 Multi homing related call flows", 3GPP SG WG2 Meeting #120, S2-172873, Mar. 2017, 4 pages.
Samsung, et al., "23.502: Update of PDU session anchor change for IPv6 multi-homed session", 3GPP SA WG2 Meeting #120, S2-172606, Mar. 2017, 5 pages.
Japan Patent Office Application No. 2019-566228, Notice of Allowance dated Dec. 15, 2020, 2 pages.
Ericsson, "23.502: IPv6 Multi homing related call flows," SA WG2 Meeting #120, S2-172608, Mar. 2017, 11 pages.

* cited by examiner

METHOD FOR TRANSCEIVING SIGNAL IN ASSOCIATION WITH MULTI-HOMING BASED PSA ADDITION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/006109, filed on May 29, 2018, which claims the benefit of U.S. Provisional Application No. 62/512,076, filed on May 29, 2017, and 62/632,428, filed on Feb. 20, 2018, the contents of which are all hereby incorporated by reference herein in their entireties.

TECHNICAL FIELD

The present disclosure relates to a wireless communication system, and more particularly, to a method and apparatus for transmitting and receiving signals in relation to multi-homing-based protocol data unit session anchor (PSA) addition.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Problem

An aspect of the present disclosure is to define operations of network nodes including a user equipment (UE), when a new Internet protocol (IP) address is assigned to the UE in relation to multi-homing-based protocol data unit session anchor (PSA) addition in a $5^{th}$ generation (5G) mobile communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of transmitting and receiving signals in relation to multi-homing-based protocol data unit session anchor (PSA) addition by a user equipment (UE) in a wireless communication system includes establishing a protocol data unit (PDU) session with a first PSA, and receiving a new Internet protocol (IP) address from a session management function (SMF). When the received new IP address is related to multi-homing-based PSA addition, the UE skips IP multimedia subsystem (IMS) registration using the new IP address.

According to an embodiment of the present disclosure, a UE for transmitting and receiving signals in relation to multi-homing-based PSA addition in a wireless communication system includes a transceiver and a processor. The processor is configured to establish a PDU session with a first PSA, and receive a new IP address from an SMF. When the received new IP address is related to multi-homing-based PSA addition, the UE skips IMS registration using the new IP address.

When the received new IP address is related to multi-homing-based PSA addition, the new IP address may be used for IMS media routing to an added second PSA.

When the received new IP address is related to multi-homing-based PSA addition, a non-access stratum (NAS) layer of the UE may provide an upper layer with information indicating that the new IP address is for IMS media routing.

When the received new IP address is related to multi-homing-based PSA addition, a NAS layer of the UE may provide an upper layer with information indicating that the new IP address is only for IMS media.

The new IP address may be a new IP version 6 (IPv6) prefix.

The upper layer may be an IMS layer.

The second PSA may be a localized user plane function (UPF).

The first PSA may be a UPF.

The UE may skip IMS registration using the new IP address based on information received from the SMF or information configured for the UE.

Advantageous Effects

According to the present disclosure, in the case of multi-homing-based protocol data unit session anchor (PSA) addition, an unnecessary IP multimedia subsystem (IMS) registration procedure may not be performed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings.

BEST MODE FOR CARRYING OUT THE INVENTION

Figure 1:
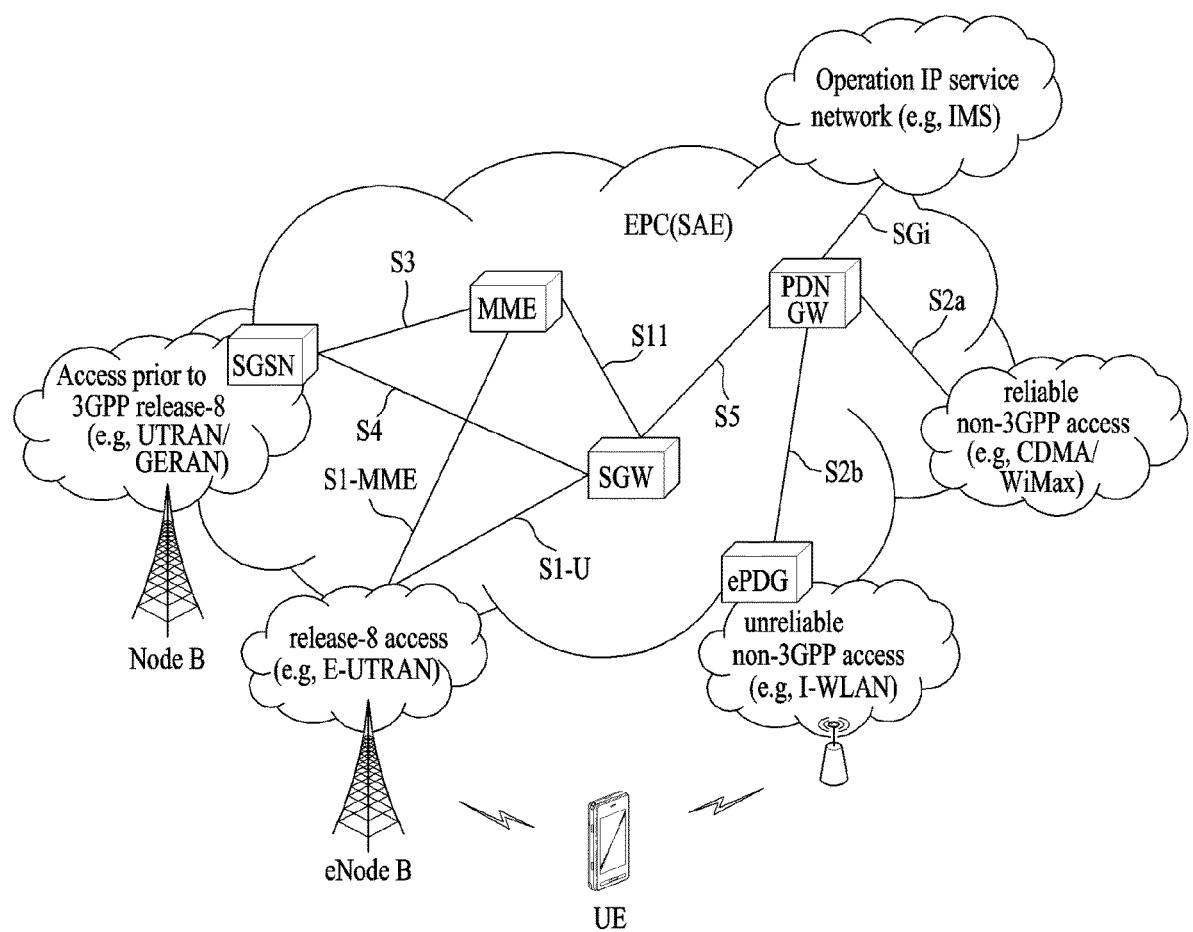
FIG. 1 is a schematic diagram illustrating the structure of an evolved packet system (EPS) including an evolved packet core (EPC)

The embodiments below are combinations of components and features of the present disclosure in a prescribed form. Each component or feature may be considered as selective unless explicitly mentioned as otherwise. Each component or feature may be executed in a form that is not combined with other components and features. Further, some components and/or features may be combined to configure an embodiment of the present disclosure. The order of operations described in the embodiments of the present disclosure may be changed. Some components or features of an embodiment may be included in another embodiment or may be substituted with a corresponding component or feature of the present disclosure.

Specific terms used in the description below are provided to help an understanding of the present disclosure, and the use of such specific terms may be changed to another form within the scope of the technical concept of the present disclosure.

In some cases, in order to avoid obscurity of the concept of the present disclosure, a known structure and apparatus may be omitted, or a block diagram centering on core functions of each structure or apparatus may be used. Moreover, the same reference numerals are used for the same components throughout the present specification.

The embodiments of the present disclosure may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present disclosure in the embodiments of the present disclosure may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present disclosure is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third-generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IP multimedia subsystem (IMS)). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2*a* and S2*b* correspond to non-3GPP interfaces. S2*a* is a reference point which provides reliable non-3GPP access and related control and mobility support between PDN GWs to a user plane.

S2b is a reference point which provides related control and mobility support between the ePDG and the PDN GW to the user plane.

Figure 2:
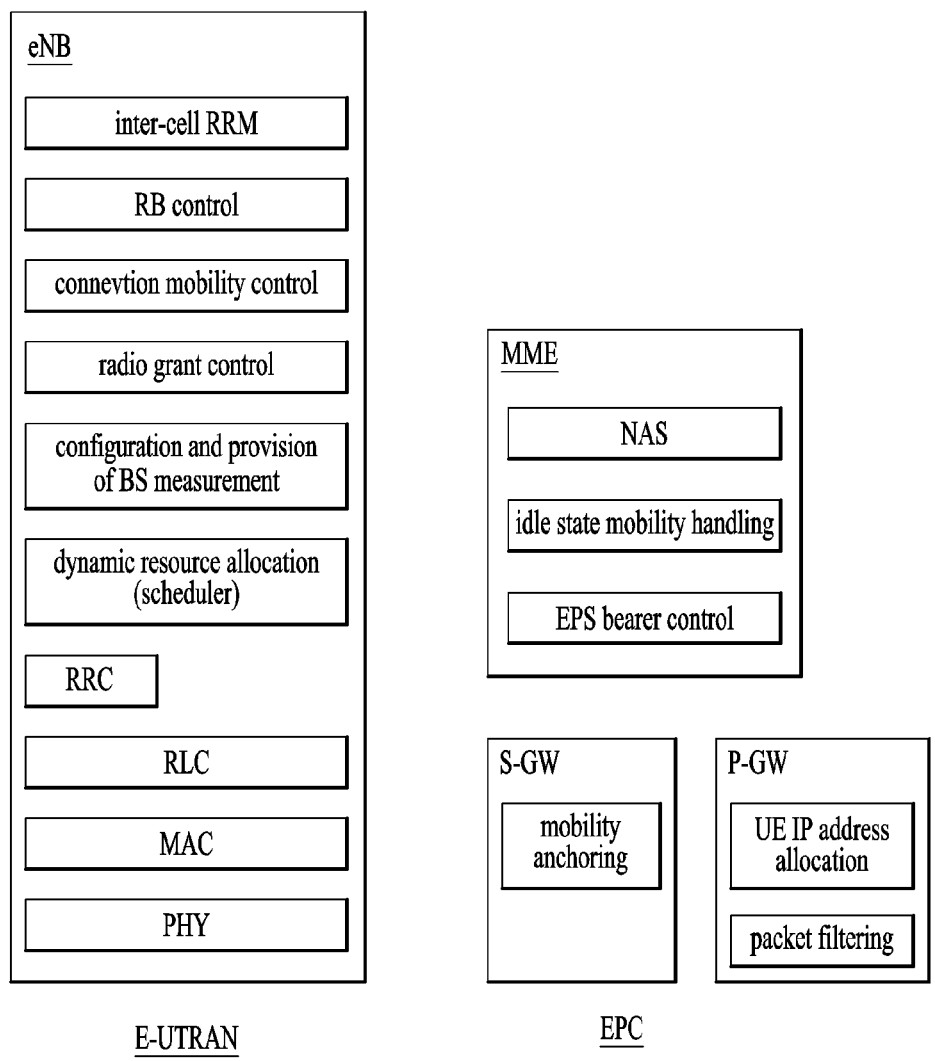
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
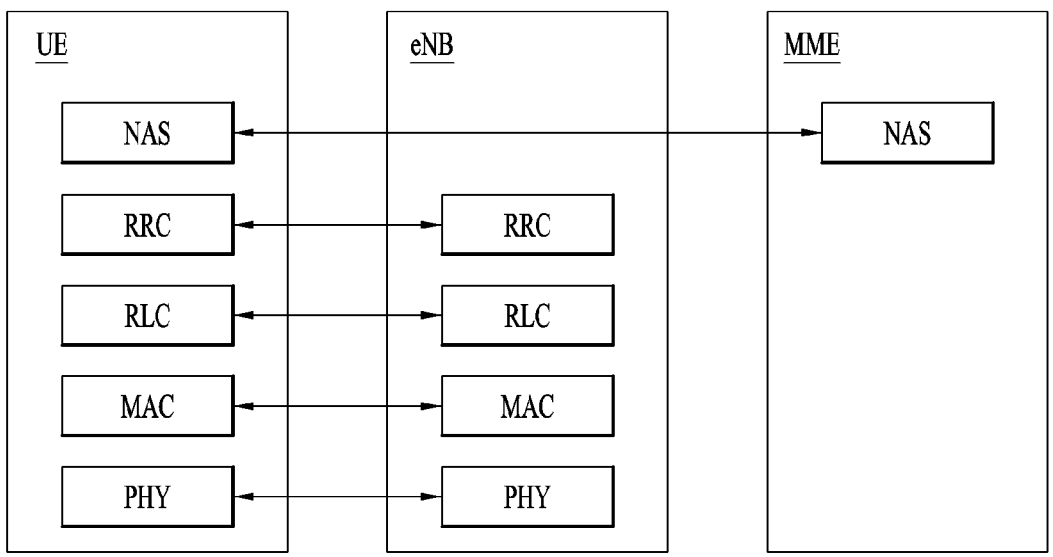
FIG. 3 is a diagram illustrating the structure of a radio interface protocol in a control plane.
Figure 4:
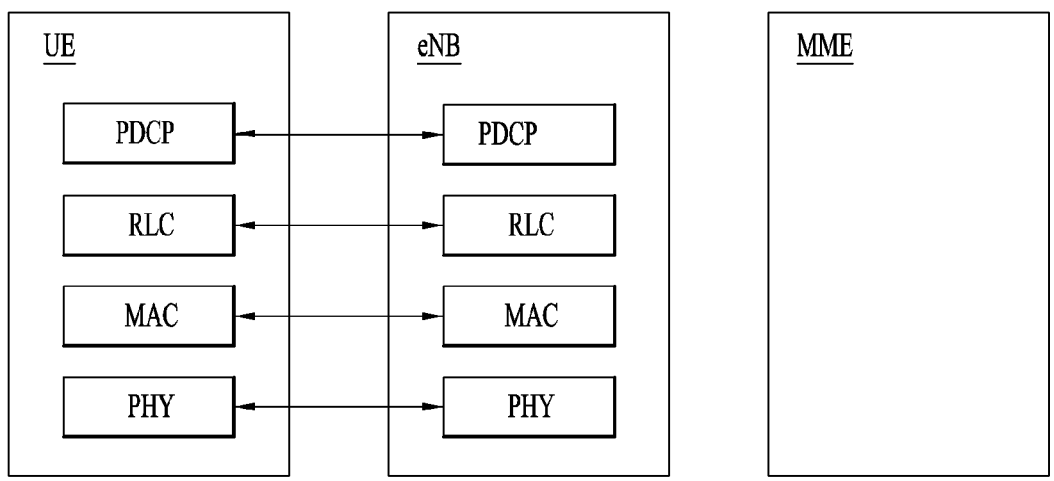
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
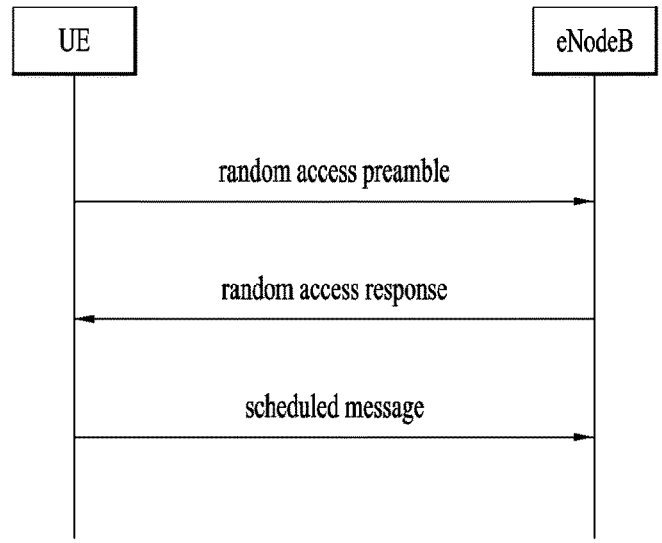
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
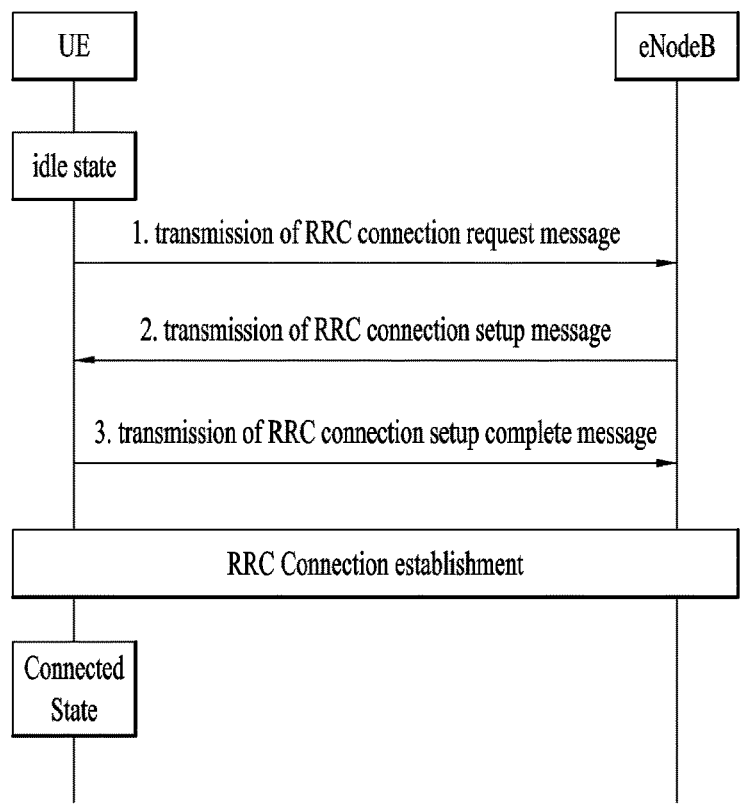
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
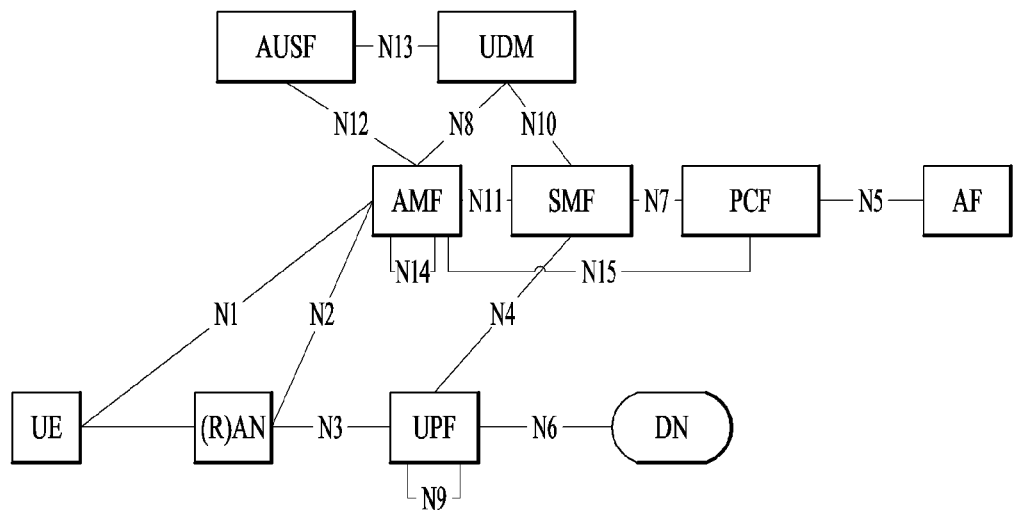
FIG. 7 is a diagram illustrating a 5$^{th}$ generation (5G) system.

The functionality of the MME in the legacy EPC is decomposed into the access and mobility management function (AMF) and the session management function (SMF) in the next generation system (or 5G core network (CN)). The AMF carries out NAS interaction with a UE and mobility management (MM), whereas the SMF carries out session management (SM). The SMF also manages a gateway, user plane function (UPF), which has the user-plane functionality, that is, routes user traffic. It may be considered that the SMF and the UPF implement the control-plane part and user-plane part of the S-GW and the P-GW of the legacy EPC, respectively. To route user traffic, one or more UPFs may exist between a RAN and a data network (DN). That is, for 5G implementation, the legacy EPC may have the configuration illustrated in FIG. 7. In the 5G system, a protocol data unit (PDU) session has been defined as a counterpart to a PDN connection of the legacy EPS. A PDU session refers to association between a UE and a DN, which provides a PDU connectivity service of an Ethernet type or an unstructured type as well as an IP type. The unified data management (UDM) performs the same functionality as the HSS of the EPC, and the policy control function (PCF) performs the same functionality as the policy and charging rules function (PCRF) of the EPC. Obviously, the functionalities may be extended to satisfy the requirements of the 5G system. N1 is a control-plane reference point between the 5G UE and the AMF, N2 is a control-plane reference point between the 5G (R)AN and the AMF, and N3 is a user-plane reference point between the 5G (R)AN and the UPF. N4 is a reference point between the SMF and the UPF, N5 is a reference pint between a policy control function (PCF) and an application function (AF), and N6 is a reference point between the UPF and the DN. The DN may be an operator external public or private data network or an operator data network. N7 is a reference point between the SMF and the PCF. For details of the architecture, each function, and each interface of a 5G system, TS 23.501 is conformed to. Particularly, the 5G system (i.e., the next generation system) should also support non-3GPP access, and architecture, network elements, and so on for supporting non-3GPP access are described in clause 4.2.7 of TS 23.501v0.2.0. A representative example of non-3GPP access is wireless local area network (WLAN) access which may cover both trusted WLAN and untrusted WLAN.

For the 5G system, TS 23.501 and TS 23.502 are being worked on. Particularly, the 5G system (i.e., the next generation system) should support IMS services, and IMS support and Emergency services are described respectively in clauses 5.16.3 and 5.16.4 of TS 23.501v0.4.0. "Annex D (informative): IMS specific placeholder for TS 23.228 [15]" in TS 23.501v0.4.0 describes what needs to be captured later for TS 23.228.

Figure 8:
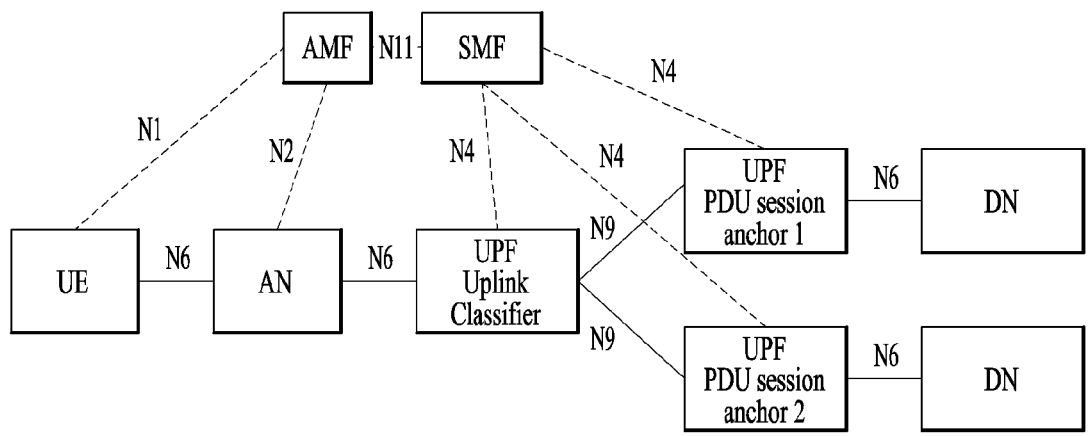
FIGS. 8 to 12 are diagrams illustrating a conventional technology related to multiple protocol data unit session anchors (PSAs)
Figure 9:
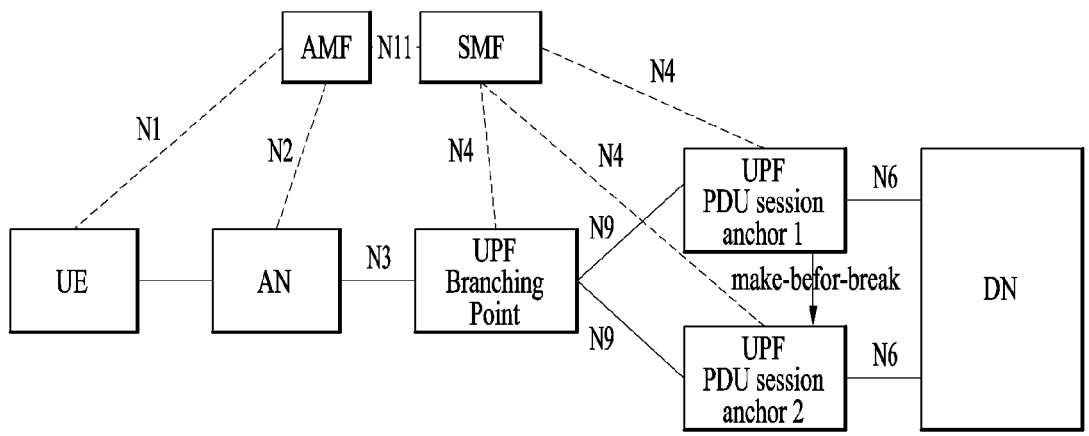
Figure 10:
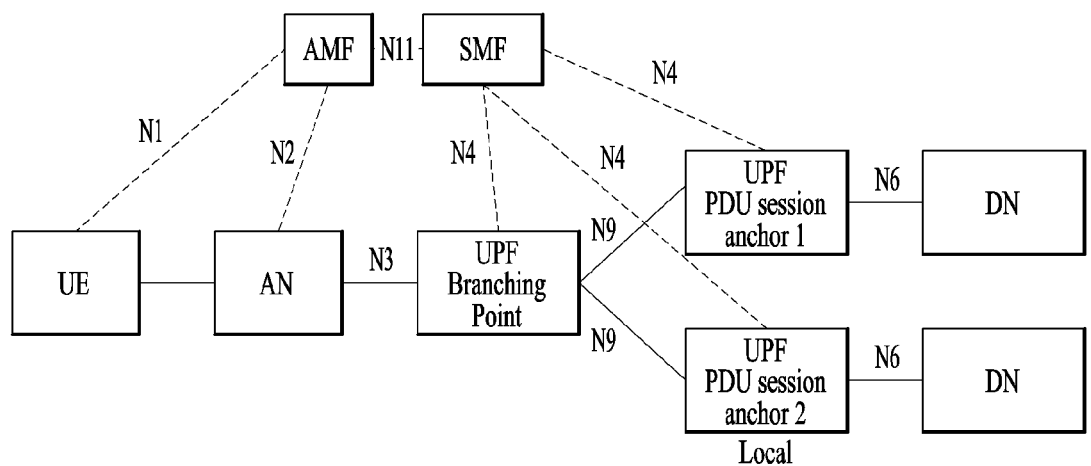

For traffic offloading or service continuity, the 5G system allows traffic routing via multiple protocol data unit session anchors (PSAs) for one PDU session. For details, see clause 5.6.4 of TS 23.501v0.4.0, from which Table 2 and Table 3 are excerpts. Figure 5.6.4.2-1, Figure 5.6.4.3-1, and Figure 5.6.4.3-2 mentioned in Table 2 and Table 3 are presented as FIGS. 8, 9 and 10, respectively.

TABLE 2

5.6.4 Single PDU session with multiple PDU session anchors
  5.6.4.1 General
In order to support traffic offloading or to support SSC mode 3 as defined in clause 5.6.9.2.3, the SMF may control the data path of a PDU session so that the PDU session may simultaneously correspond to multiple N6 interfaces. The UPF that terminates each of these interfaces is said to support an PDU session anchor functionality. Each PDU session anchor supporting a PDU session provides a different access to the same DN.
  Editor's note: The terminology "PDU session anchor" is to be revisited.
  Editor's note: Proper terminology improvement is needed to distinguish Local Break Out (when referring to roaming) and offload for local traffic
This may correspond to
     The Usage of an UL Classifier functionality for a PDU session defined in clause 5.6.4.2.
     The Usage of an IPv6 multi-homing for a PDU session defined in clause 5.6.4.3.
  5.6.4.2 Usage of an UL Classifier for a PDU session
In case of PDU sessions of type IPv4 or IPv6 or Ethernet, the SMF may decide to insert in the data path of a PDU session an "UL CL" (Uplink classifier). The UL CL is a functionality supported by an UPF that aims at diverting (locally) some traffic matching traffic filters provided by the SMF. The in sertion and removal of an UL CL is decided by the SMF TABLE 2-continued and controlled by the SMF using generic N4 and UPF capabilities. The SMF may decide to insert in the data path of a PDU session or to remove from the data path of a PDU session a UPF supporting the UL CL functionality either during or after the PDU session establishment. The SMF may include more than one UPF supporting the UL CL functionality in the data path of a PDU session.
The UE is unaware of the traffic diversion by the UL CL, and does not involve in both the insertion and the removal of UL CL. In case of a PDU session of IP type, the UE associates the PDU session with either a single IPv4 address or a single IPv6 Prefix allocated by the network.
  Editor's note: The needs for UE aware UL CL insertion and removal are FFS.
  Editor's note: The normative phase will determine whether it is needed to make the UE aware that access to local services is possible and if yes how.
When an UL CL functionality has been inserted in the data path of a PDU session, there are multiple PDU session anchors for this PDU session. These PDU session anchors provide different access to the same DN.
The UL CL provides forwarding of UL traffic towards different PDU session anchors and merge of DL traffic to the UE i.e. merging the traffic from the different PDU session anchors on the link towards the UE. This is based on traffic detection and traffic forwarding rules provided by the SMF.
The UL CL applies filtering rules (e.g. to examine the destination IP address/Prefix of UL IP packets sent by the UE) and determines how the packet should be routed. The UPF supporting an UL CL may also be controlled by the SMF to support traffic measurement for charging, traffic replication for LI and bit rate enforcement (per PDU session AMBR).
  NOTE 2: The UPF supporting an UL CL may also support a PDU session anchor for connectivity to the local access to the data network (including e.g. support of tunnelling or NAT on N6). This is controlled by the SMF
The insertion of an UPF in the data path of a PDU session is depicted in FIG. 5.6.4.2-1.
  NOTE 3: The same UPF may support both the UL CL and the PDU session anchor functionalities
In Home Routed case the visited operator is only allowed to use local access to a DN in case the home operator has explicitly allowed it.

TABLE 3

5.6.4.3 Usage of IPv6 multi-homing for a PDU session
A PDU session may be associated with multiple IPv6 prefixes. This is referred to as multi-homed PDU session. The multi-homed PDU session provides access to the Data Network via more than one PDU (IPv6) anchor. The different user plane paths leading to the different PDU anchors branch out at a "common" UPF referred to as a UPF supporting "Branching Point" functionality. The Branching Point provides forwarding of UL traffic towards the different PDU anchors and merge of DL traffic to the UE i.e. merging the traffic from the different PDU anchors on the link towards the UE.
The UPF supporting a Branching Point functionality may also be controlled by the SMF to support traffic measurement for charging, traffic replication for LI and bit rate enforcement (per PDU session AMBR). The insertion and removal of a UPF supporting Branching Point is decided by the SMF and controlled by the SMF using generic N4 and UPF capabilities. The SMF may decide to insert in the data path of a PDU session or to remove from the data path of a PDU session a UPF supporting the Branching Point functionality either during or after the PDU session establishment.
Multi homing of a PDU session applies only for PDU sessions of IPv6 type.
The use of multiple IPv6 prefixes in a PDU session is characterised by the following:
     The UPF supporting a Branching Point functionality is configured by the SMF to spread the UL traffic between the IP anchors based on the Source Prefix of the PDU (which may be selected by the UE based on routing information and preferences received from the network).
     IETF RFC 4191 [8] is used to configure routing information and preferences into the UE to influence the selection of the source Prefix.

TABLE 3-continued

| | |
|---|---|
| NOTE 1: | This corresponds to Scenario 1 defined in IETF RFC 7157 [7] "IPv6 Multihoming without Network Address Translation". This allows to make the Branching Point unaware of the routing tables in the Data Network and to keep the first hop router function in the IP anchors.<br>The multi-homed PDU session may be used to support make-before-break service continuity to support SSC mode 3. This is illustrated in FIG. 5.6.4.3-1.<br>The multi homed PDU session may also be used to support cases where UE needs to access both a local service (e.g. local server) and a central service (e.g. the internet), illustrated in FIG. 5.6.4.3-2.<br>The UE shall use the method specified in TS 23.502[3], clause 4.3.5.3, to determine if a multi-homed PDU session is used to support the service continuity case shown in FIG. 5.6.4.3-1, or if it is used to support the local access to DN case shown in FIG. 5.6.4.3-2. |
| NOTE 2: | The same UPF may support both the Branching Point and the PDU session anchor functionalities |
| NOTE 3: | The same UPF may support both the Branching Point and the PDU session anchor functionalities |
| Editor's note: | Further clarification is needed to highlight in the figures the difference between FIG. 5.6.4.3-1 that addresses a mobility case and FIG. 5.6.4.3-2 that addresses local offload i.e. that refers to one of the PDU session anchors being deployed topologically near the AN |
| | In case of HR roaming, the visited operator is allowed to use an IP anchor in the VPLMN only in case the home operator has explicitly allowed it. |
| | Editor's note The Relationship between SSC mode 1 and multi-homing is FFS. |

Figure 11:
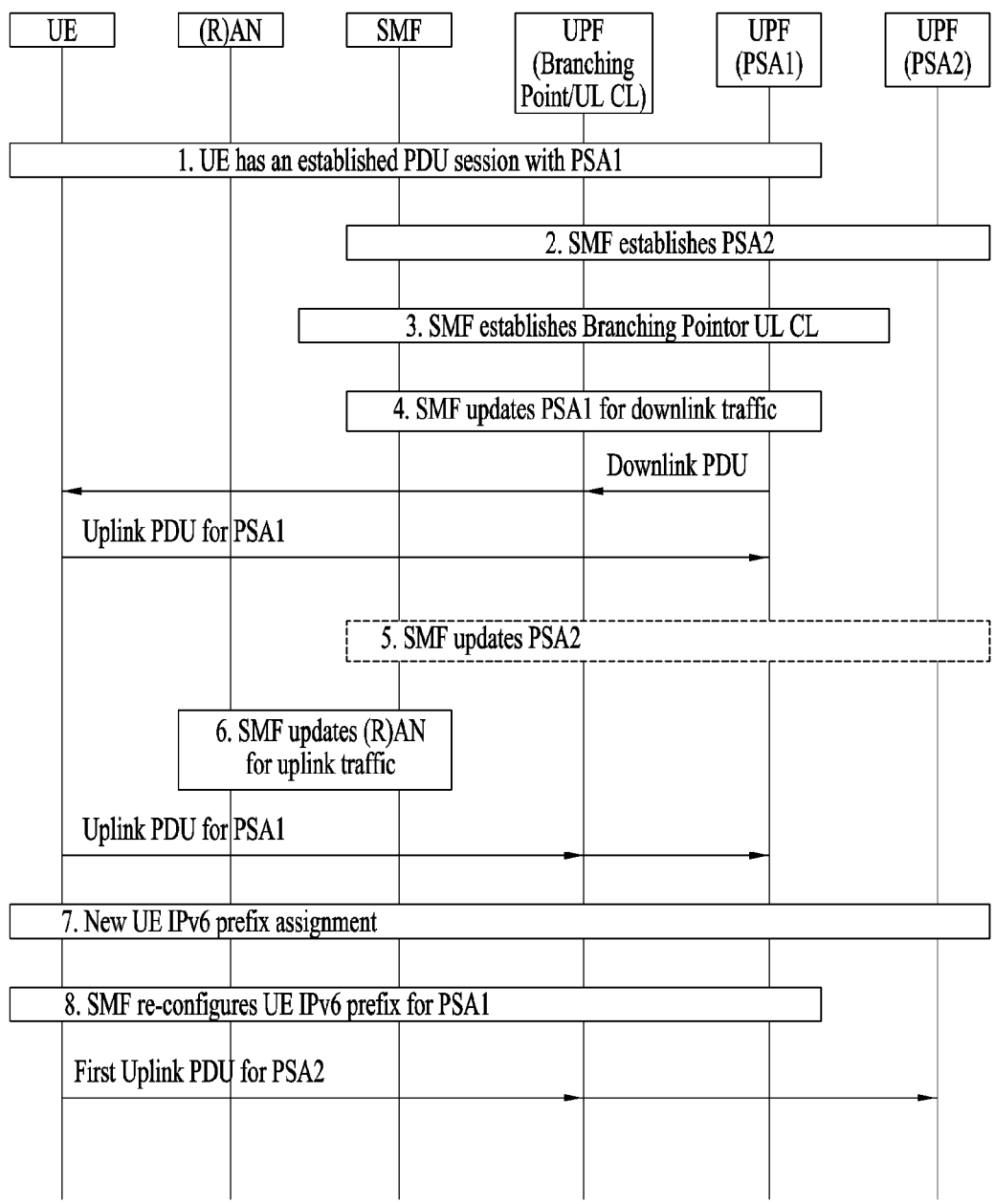

For a procedure of adding a branching point or an uplink classifier (UL CL) in a traffic routing path of one PDU session to route traffic via multiple PSAs for the PDU session, see clause 4.3.5.2a of TS 23.502v0.3.0, from which Table 4 is an excerpt. Figure 4.3.5.2a-1 in Table 4 is presented as FIG. 11. In step 1, a PDU session is created. For this purpose, a UE exchanges NAS messages with a 5G core network (for details, see clause 4.3.2 (PDU Session establishment) of TS 23.502v0.3.0). Subsequently, when a new IP address is assigned to the UE through multi-homing, the UE acquires IP prefix information from an IPv6 Router Advertisement message transmitted on the user plane as in step 7. Then, there is no additional NAS message exchange between the UE and the 5G core network. For reference, if the UE does not receive a valid lifetime value for an old/original IP address (or when the UE receives re-configuration information/a routing rule for the old/original IP address) when the UE is assigned the new IP address, the UE may consider that a branching point is added.

TABLE 4

4.3.5.2a Addition of PDU session Anchor and Branching Point or UL CL for a PDU session
This clause describes a procedure to add a PDU session Anchor and a Branching Point or UT CL for an established PDU session.

1. UE has an established PDU Session with a UPF including the PDU Session Anchor 1 (PSA1 in FIG. 4.3.5.2a-1). The PDU Session User Plane involves at least the RAN and the PDU Session Anchor 1.
2. At some point the SMF decides to establish a new PDU Session Anchor e.g. due to UE mobility, new flow detection. The SMF selects a UPF and using N4 establish the new PDU Session Anchor 2 (PSA2 in FIG. 4.3.5.2a-1) of the PDU Session. In case of IPv6 multi-homing PDU Session, the SMF also allocates a new IPv6 prefix corresponding to PSA2.
3. The SMF selects a UPF and using N4 establish the Branching Point (in case of IPv6 multi-homing) or a UL CL for the PDU Session. It provides the necessary uplink forwarding rules towards PSA1 and PSA2 including the PSA1 CN Tunnel Info and the PSA CN Tunnel Info. In addition, the AN Tunnel Info is provided for downlink forwarding. In case of IPv6 multi-homing, the SMF also provides traffic filters for the IPv6 prefixes corresponding to PSA1 and PSA2 indicating what traffic shall be forwarded towards PSA1 and PSA2 respectively. In case of UL CL, the SMF provides traffic filters indicating what traffic shall be forwarded towards PSA1 and PSA2 respectively.

NOTE 1: In case the Branching Point or UL CL and the PSA2 are co-located in a single UPF then steps 2 and 3 may be merged. In case a Branching Point is already allocated, step 3 is skipped.

4. The SMF updates the PSA1 via N4. It provides the Branching Point or UL CL CN Tunnel Info for the downlink traffic.

NOTE 2: In case the Branching Point or UL CL and the PSA1 are co-located in a single UPF then steps 3 and 4 may be merged.

5. The SMF updates PSA2 via N4. It provides the Branching Point or UL CL CN Tunnel Info for down-link traffic.

NOTE 3: In case the Branching Point or UL CL and the PSA2 are co-located in a single UPF then step 5 not needed.

6. The SMF updates (R)AN via N2 SM information over N11. It provides the new CN Tunnel Info corresponding to the UPF (Branching Point or UL CL). In case of UL CL, if there is an existing UPF between the (R)AN and new inserted UL CL, the SMF updates the existing UPF via N4 instead of updating the (R)AN.

TABLE 4-continued

7. In case of IPv6 multi-homing, the SMF notifies the UE of the availability of the new IP prefix @ PSA2. This is performed using an IPv6 Router Advertisement message (RFC 4861 [6]) Also, the SMF sends routing rule along with the IPv6 prefix to the UE as described in TS 23.501 [2] clause 5.8.1.2.
8. In case of IPv6 multi-homing, the SMF may re-configure the UE for the original IP prefix @ PSA1. This is performed using an IPv6 Router Advertisement message (RFC 4861 [6]).

Figure 12:
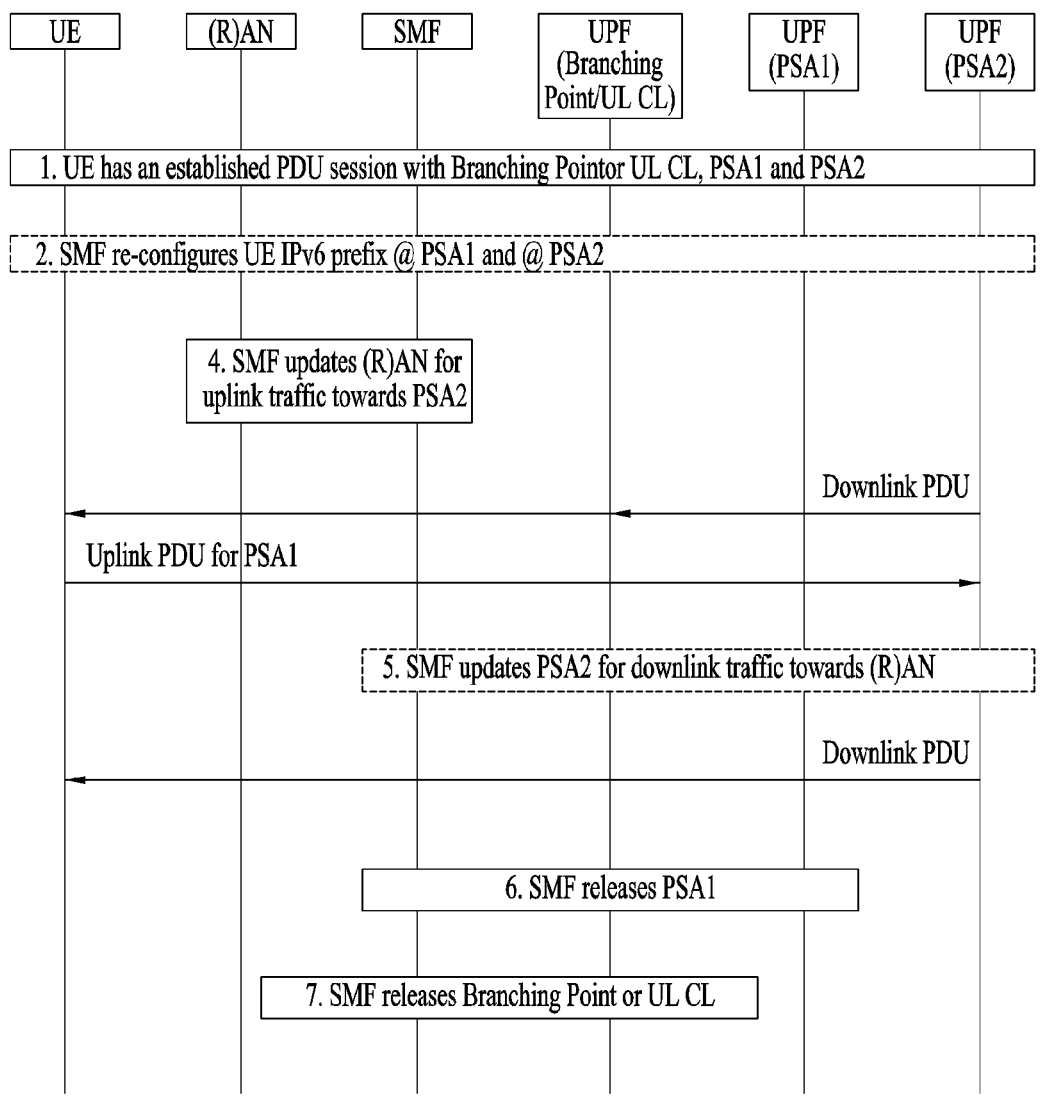

For a procedure of removing a branching point or an uplink classifier (UL CL) which has been added in a routing path of traffic of a PDU session, see clause 4.3.5.2b of TS 23.502v0.3.0, from which Table 5 is an excerpt. Figure 4.3.5.2b-1 in Table 5 is presented as FIG. 12.

TABLE 5

4.3.5.2b Removal of PDU session Anchor and Branching Point or UL CL for a PDU session
This clause describes a procedure to remove a PDU session Anchor and (optionally) remove Branching Point or UL CL for an established PDU session.
1. UE has an established PDU Session with a UPF including the Branching Point or UL CL, the PDU Session Anchor 1 (PSA1 in FIG. 4.3.5.2b-1) and the PDU Session Anchor 2 (PSA2 in FIG. 4.3.5.2b-1).
   At some point the SMF decides to remove the PDU Session Anchor 1 e.g. due to UE mobility, flow terminated.
2. In case of IPv6 multi-homing, the SMF notifies the UE to stop using the IPv6 prefix corresponding to PSA1. This is performed by IPv6 Router Advertisement message (RFC 4861 [6] and RFC 4862 [x]). Also, the SMF sends routing rule along with the IPv6 prefix corresponding to PSA2 to the UE as described in TS 23.501 [2] clause 5.8.1.2. Based on the information provided in the Router Advertisement, the UE starts using the IPv6 prefix (corresponding to PSA2) for all the traffic.
4. If the Branching Point or UL CL is to be released, the SMF updates the (R)AN with the PSA2 CN Tunnel Info. In case of UL CL, if there is an existing UPF between the (R)AN and the UL CL to be removed, the SMF updates the existing UPF via N4 instead of updating the (R)AN.
5. If the Branching Point or UL CL is to be released, the SMF updates via N4 the PSA2 providing the (R)AN Tunnel Info. In case of UL CL, if there is an existing UPF between the (R)AN and the UL CL to be removed, the SMF updates the PSA2 providing the UPF CN tunnel Info.
6. The SMF releases via N4 the PSA1. In case of IPv6 multi-homing, the SMF also releases the corresponding IPv6 prefix.
7. If steps 4 and 5 were executed, the SMF releases the Branching Point/UL CL.

Figure 13:
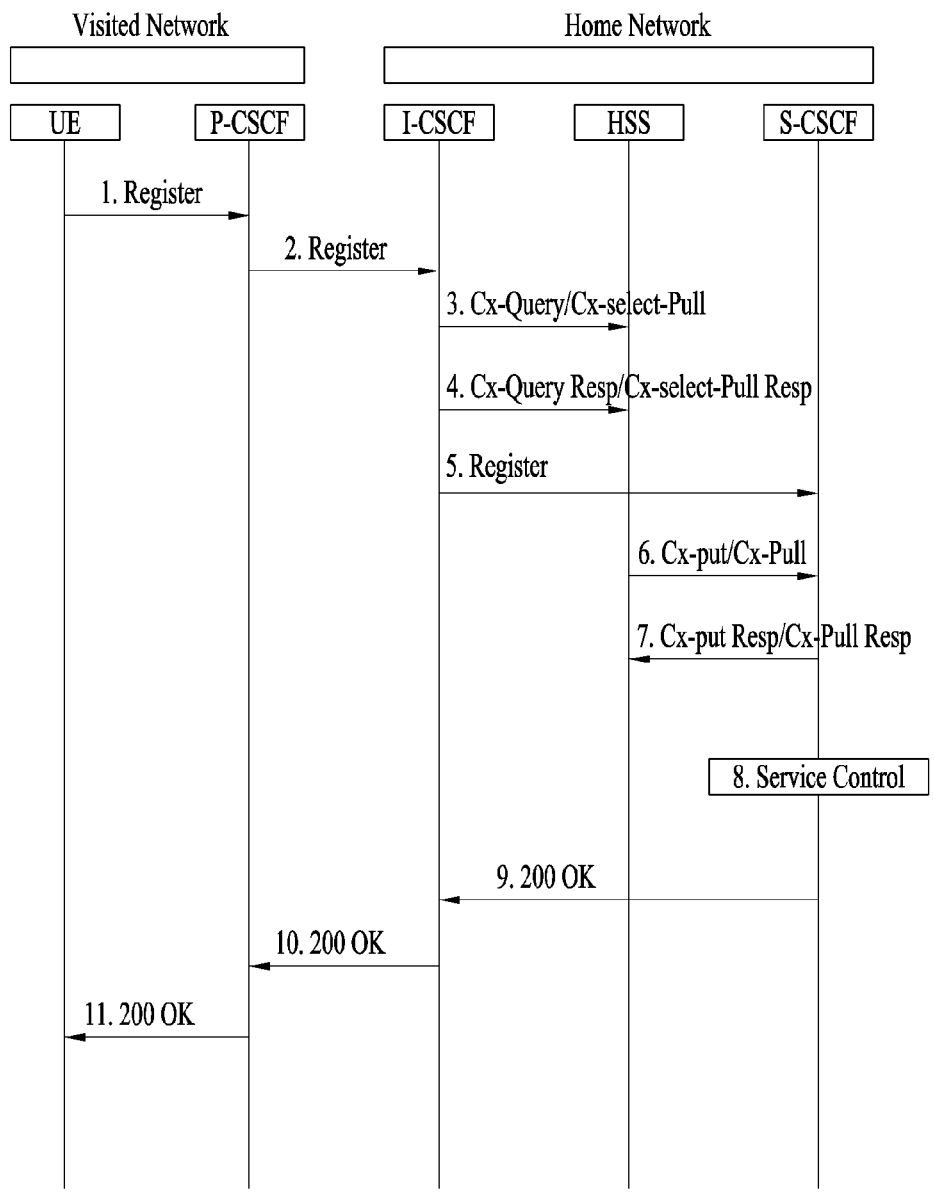
FIG. 13 is a diagram illustrating an IP multimedia subsystem (IMS) registration procedure.

FIG. 13 illustrates an IMS registration procedure. For details of the IMS registration procedure, see clause 5.2 (Application level registration procedures) of TS 23.228.

Now, a description will be given of operations of a UE and network nodes, when a PSA and/or a branching point (BP) are added or removed for a PDU session by multi-homing according to an embodiment of the present disclosure.

While the present disclosure is described in the context of multi-homing for a single PDU session with multiple PSAs, the present disclosure may also be extended/modified for application to a UL CL for a PDU session. Then, it should be interpreted that multi-homing-based BP addition for a PDU session amounts to UL CL addition for a PDU session, and multi-homing-based BP removal for a PDU session amounts to UL CL removal for a PDU session. Further, the present disclosure may also be extended/modified for application to multiple PDU sessions created for an IMS data network name (DNN) (additionally, the same Single Network Slice Selection Assistance Information (S-NSSAI)). Then, it should be interpreted that multi-homing-based BP addition for a PDU session amounts to creation of an additional PDU session for an IMS DNN (additionally, the same S-NSSAI), multi-homing-based BP removal for a PDU session amounts to removal of one of multiple PDU sessions for an IMS DNN (additionally, the same S-NSSAI), and a branched PDU session is a new created PDU session.

Multi-Homing-Based PSA Addition

Figure 14:
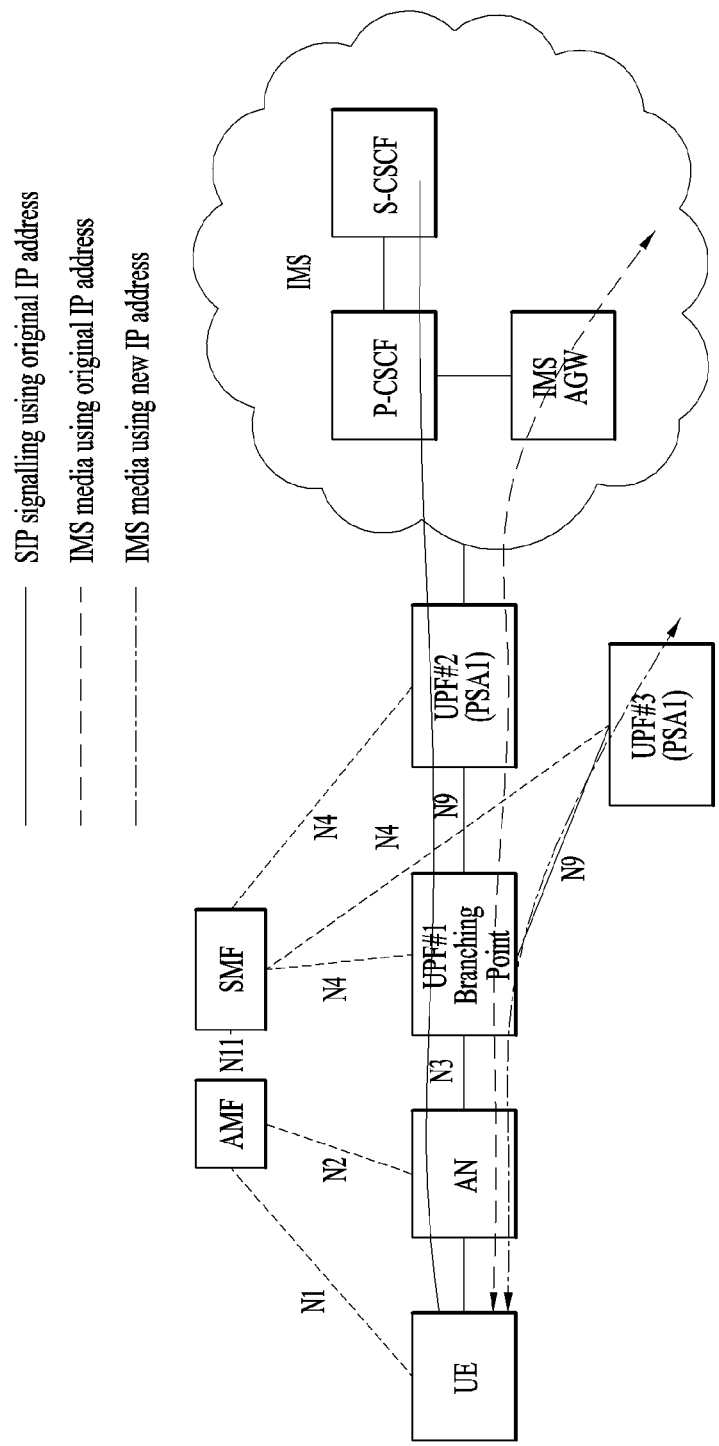
FIG. 14 is a diagram illustrating routing of IMS media via a localized user plane function (UPF), using a new Internet protocol (IP) address according to an embodiment of the present disclosure.

A UE may establish a PDU session with a first PSA and receive a new IP address (a new Ipv4 address, a new IPv6 prefix, or a new IPv6 address) from an SMF. According to the legacy LTE standard which is conventional technology, when a UE receives a new IP address for an IMS PDN connection, the UE is supposed to perform the IMS registration procedure illustrated in FIG. 13. In contrast, if the received new IP address is related to multi-homing-based PSA addition, the UE may not perform IMS registration using the new IP address. If the received new IP address is related to multi-homing-based PSA addition, the new IP address may be used for IMS media routing to a second PSA (a localized UPF) (a path labeled with IMS media using new IP address in FIG. 14). As described later in detail with reference to FIG. 15, having established the PDU session with the first PSA, the UE receives an IPv6 address from the first PSA and registers to an IMS network, using the IPv6 address. Therefore, when the UE, which has already registered to the IMS network, has multiple PSAs by multi-homing, the UE's IMS registration each time the UE receives a new IP address is very inefficient.

When the new IP address is assigned to the UE, the NAS layer of the UE provides the new IP address to an IMS layer (an upper layer from the viewpoint of the NAS layer). If the received new IP address is related to multi-homing-based PSA addition, the NAS layer of the UE provides the upper layer with information indicating that the new IP address is for IMS media routing. Alternatively, if the received new IP address is related to multi-homing-based PSA addition, the NAS layer of the UE provides the upper layer with information indicating that the new IP address is only for IMS media. The upper layer refers to the IMS layer, and the first PSA may be a UPF. In other words, although the UE does not perform IMS registration, when a new IP address is assigned to the UE, the NAS layer of the UE provides the new IP address to the IMS layer (the upper layer from the viewpoint of the NAS layer). The NAS layer of the UE may also provide the IMS layer with one or more of information indicating that this IP address is not for IMS registration (IMS registration should not be performed, using this IP address or IMS registration using this IP address should be skipped), information indicating that this IP address is not for session initiation protocol/IP multimedia subsystem (SIP/IMS) signaling (or this IP address should not be used for SIP/IMS signaling), and information indicating that this IP address is for media/IMS services (or for media/IMS services routing).

The UE may use an IP address used for IMS registration as an IP address for SIP/IMS signaling or SIP method routing (transmission and reception), and use the IP address used for the IMS registration and the new allocated IP address as an IP address (which may be included in a session description protocol (SDP) part) for media/IMS services routing (transmission and reception).

The operation of skipping IMS registration at the UE despite assignment of a new IP address may be based on information received from the SMF and/or information configured in the UE (e.g., the UE is configured to skip IMS registration, when the UE is assigned an additional IP address due to multi-homing-based BP addition) and/or information received from a network function (e.g., an AMF, a policy-related function, an IMS node, or the like) other than the SMF.

Figure 15:
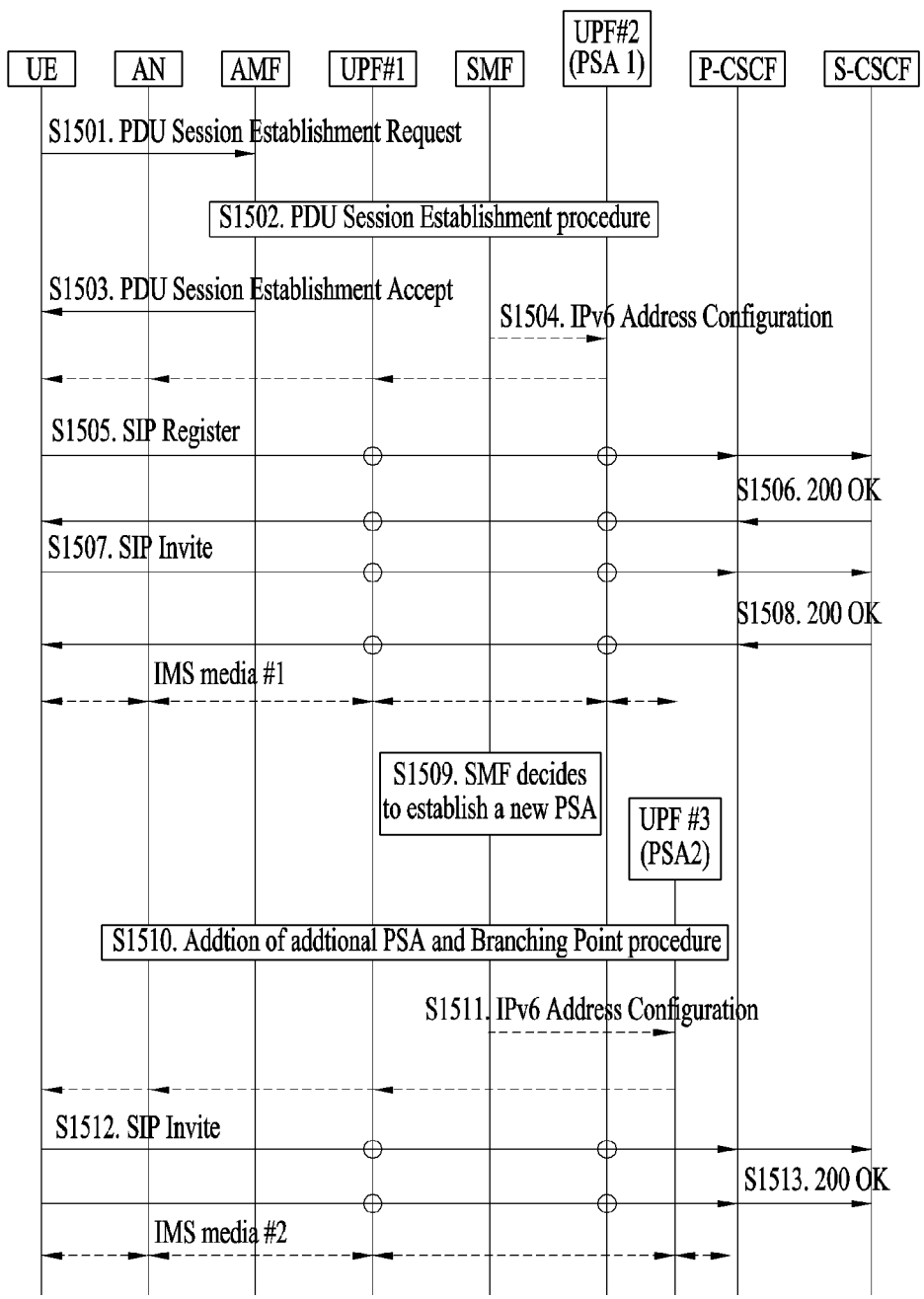
FIG. 15 is a diagram illustrating a procedure of routing IMS media, using a new IP address according to an embodiment of the present disclosure.
Figure 16:
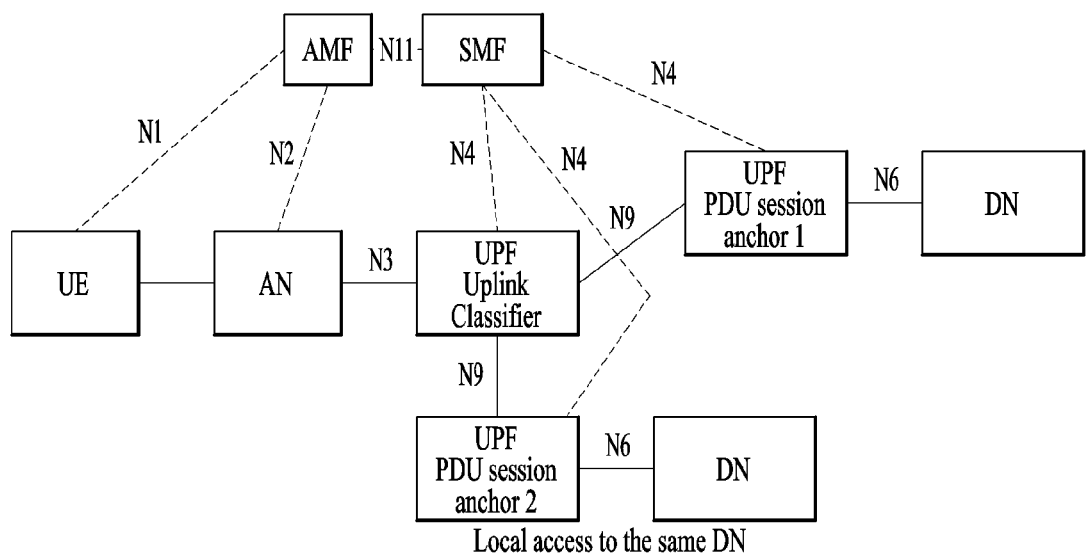
FIGS. 16 to 19 are illustrations of drawings mentioned in Table 10, Table 11 and Table 12.
Figure 17:
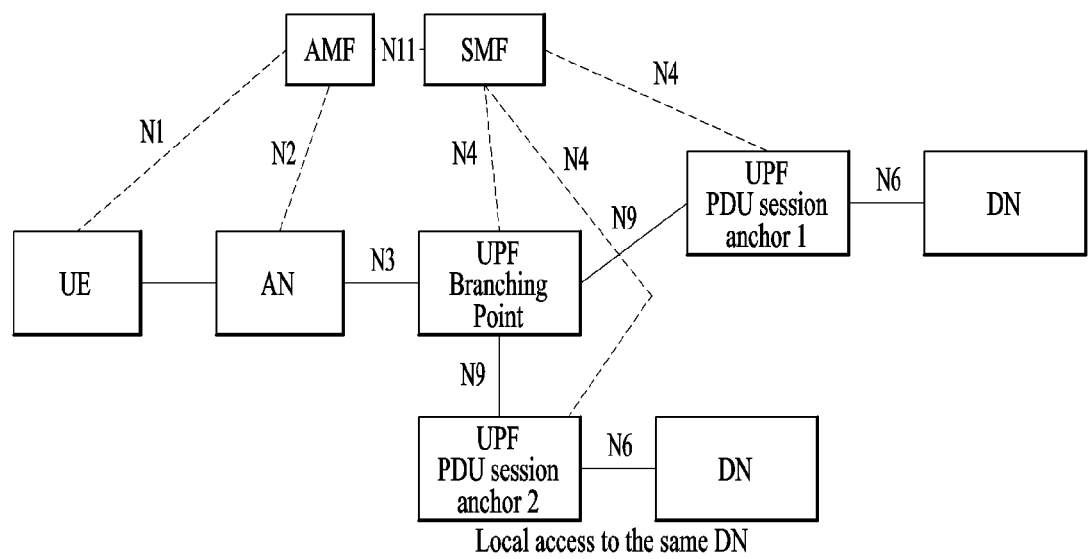
Figure 18:
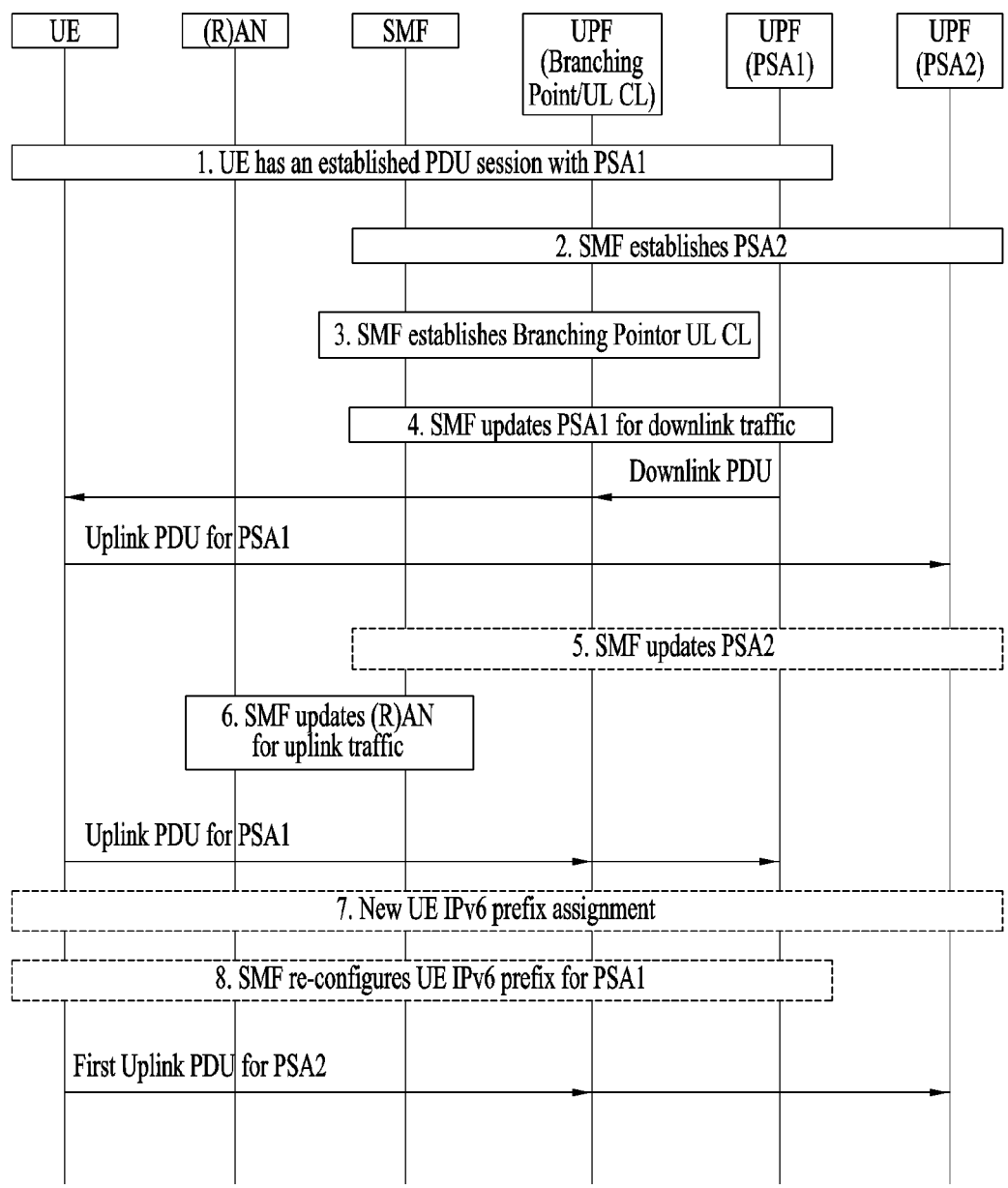
Figure 19:
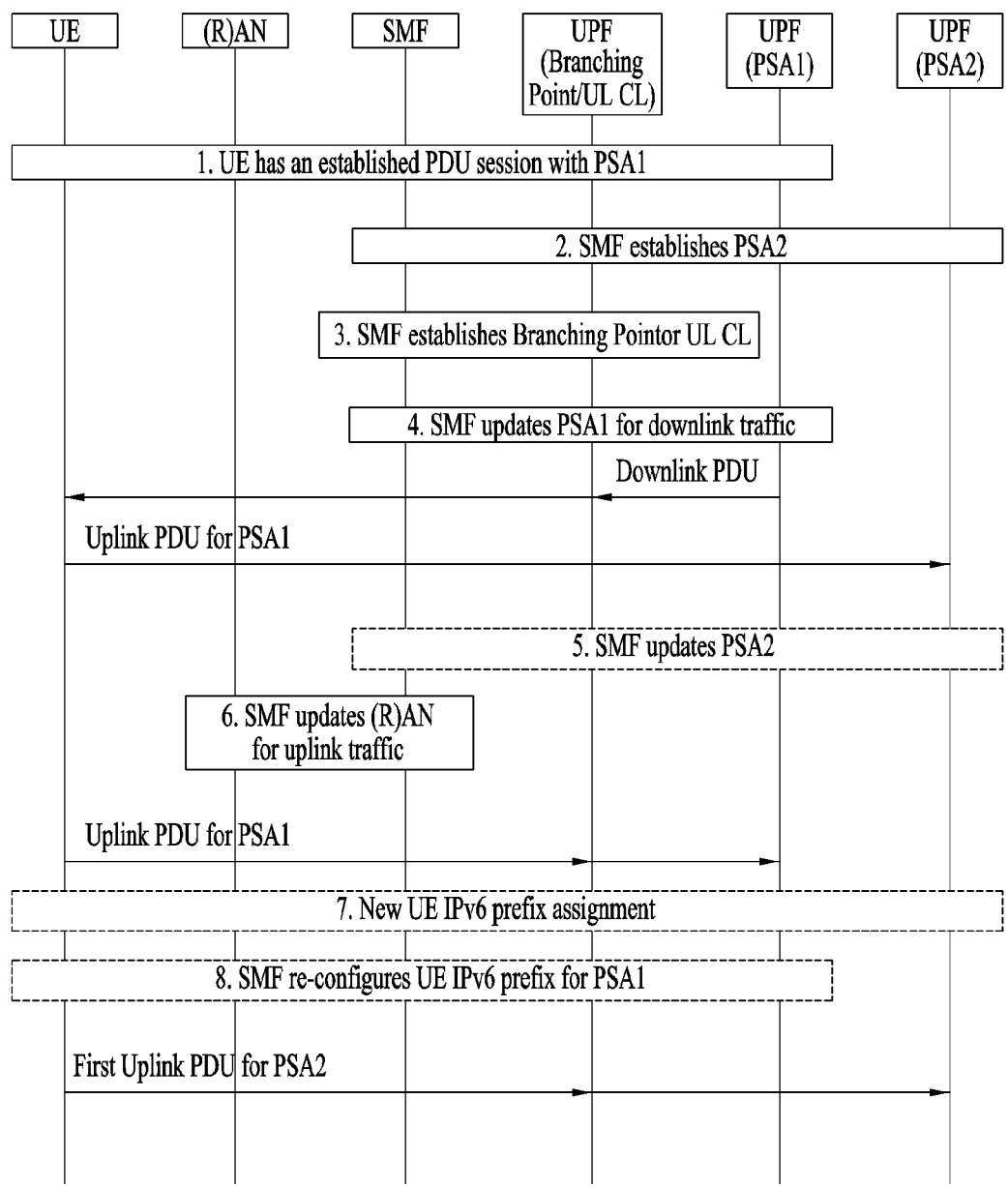

With reference to FIG. 15, operations of a UE and other network functions, and related signaling in the case of the above-described multi-homing-based PSA addition will be described below in detail.

Referring to FIG. 15, in steps S1501, S1502 and S1503, the UE transmits a PDU Session Establishment Request message to an AMF, to create a PDU session. Upon receipt of the PDU Session Establishment Request message, the AMF performs a PDU session establishment procedure and then transmits a PDU Session Establishment Accept message to the UE. It is assumed that UPF #2 has been selected as a PSA for the PDU session. It is also assumed that a UPF establishing an N3 tunnel with an access network (AN) is UPF #1. The UE has registered to a 5G system (5GS).

In step S1504, an SMF serving the PDU session generates an IPv6 Router Advertisement message and transmits the IPv6 Router Advertisement message to the UE via the UPF, to configure an IPv6 address for the UE.

Details of the PDU session establishment procedure in steps S1501 to S1504 are pursuant to TS 23.502.

In steps S1505 and S1506, the UE, which has acquired the new IP address by creating the IMS PDU session, determines to perform IMS registration. When at least one of the conditions described in Table 6 below is satisfied, the UE may determine to perform IMS registration.

TABLE 6

1) if the UE is operating in the "voice centric" way;
2) if the UE is capable of receiving any (but not necessarily all) of the media types which the CS domain supports, such that the media type can also be used when accessing the IMS using the current IP-CAN (IP-Connectivity Access Network);
3) if:
   a) the media type of item 2 is an "audio" media type
   b) the UE supports codecs suitable for (conversational) speech; and
   c) the "audio" media type is not restricted from inclusion in an SDP message according to the media type restriction policy as specified in clause 6.1.1 of TS 24.229
       and one of the following is true:
   a) 3GPP PS data off status is "inactive"; or
   b) 3GPP PS data off status is "active" and MMTEL voice is a 3GPP PS data off exempt service;
4) if the UE determines that its contact has not been bound to a public user identity using the IP-CAN, such that the contact is expected to be used for the delivery of incoming requests in the IMS relating to the media of item 2 and item 3;
5) if the IMSVoPS(IMS voice over PS Session Supported) indicator, provided by the lower layers indicates voice is supported;
6) if the procedures to perform the initial registration are enabled (TS 24.305 참고); and
7) if the PDU session used for IMS is:
   a) available; or
   b) not available, and the UE is able to initiate the establishment of a PDU session used for IMS.
8) If the indication that the new IPv6 address (or the newly acquired IP address) is only for IMS media/traffic is not provided by the lower layer (or the NAS layer).

However, even when any other condition than item 1 is satisfied, the UE may determine to perform IMS registration. Further, the UE may determine to perform IMS registration, for IMS service reception, when a part of the conditions are satisfied or irrespective of the conditions.

Once the UE determines to perform IMS registration, the UE registers to the IMS. An example of an SIP REGISTER message that the UE transmits to a P-CSCF is given in Table 7 below, and the UE provides the IP address in a Contact header field (5555::aaa:bbb:ccc:ddd in the following example) to the IMS.

TABLE 7

REGISTER sip:registrar.home1.net SIP/2.0
Via: SIP/2.0/UDP [5555::aaa:bbb:ccc:ddd];comp=sigcomp;branch=z9hG4bKnashds7
Max-Forwards: 70
P-Access-Network-Info: 3GPP-NR-FDD; utran-cell-id-3gpp=234151D0FCE11
From: <sip:userl_public1@home1.net>;tag=4fa3
To: <sip:user1_public1 @home1.net>
Contact: <sip:[5555::aaa:bbb:ccc:ddd];comp=sigcomp>; expires=600000
Call-ID: apb03a0s09dkjdfglkj49111
Authorization: Digest username="user1_private@home1.net", realm="registrar.home1.net", nonce="", uri="sip:registrar.home1.net", response=""
Security-Client: ipsec-3gpp; alg=hmac-sha-1-96; spi-c=23456789; spi-s=12345678; port-c=2468; port-s=1357
Require: sec-agree
Proxy-Require: sec-agree
CSeq: 1 REGISTER
Supported: path
Content-Length: 0

For details of IMS registration, refer to TS 23.228 and TS 24.229.

In steps S1507 and S1508, the UE transmits an SIP INVITE message to the P-CSCF, to initiate an IMS session. Upon receipt of the SIP INVITE message, the IMS performs a session setup with a peer UE of the IMS session. As the UE receives an SIP 200 OK message, the IMS session is established.

An example of the SIP INVITE message that the UE transmits to the P-CSCF is given below. The UE uses the IP address acquired in step S1504 as an IP address for SIP signaling exchange (an IP address in Via and the Contact header field, which is 5555::aaa:bbb:ccc:ddd in the following example) and an IP address for IMS media exchange (an IP address in an SDP part, that is, an IP address under a Content-Length header field, which is 5555::aaa:bbb:ccc:ddd in the example of Table 8).

TABLE 8

INVITE tel:+1-212-555-2222 SIP/2.0
Via: SIP/2.0/UDP [5555::aaa:bbb:ccc:ddd]:1357;comp=sigcomp; branch=z9hG4bKnashds7
Max-Forwards: 70
Route: <sip:pcscf1.visited1.net:7531;lr;comp-sigcomp>, <sip:scscf1.home1.net;lr>
P-Preferred-Identity: "John Doe" <sip:user1_public1@home1.net>
P-Access-Network-Info: 3GPP-NR-FDD; utran-cell-id-3gpp=234151D0FCE11
Privacy: none
From: <sip:user1_public1@home1.net>;tag=171828
To: <tel:+1-212-555-2222>
Call-ID: cb03a0s09a2sdfqlkj490333
Cseq: 127 INVITE
Require: precondition, sec -agree
Proxy-Require: sec-agree TABLE 8-continued

```
Supported: 100rel
Security-Verify: ipsec-3gpp; q=0.1; alg=hmac-sha-1-96;
spi-c=98765432; spi-s-87654321; port-c=8642; port-s=7531
Contact: <sip:[5555::aaa:bbb:ccc:ddd]:1357;comp=sigcomp>
Allow: INVITE, ACK, CANCEL, BYE, PRACK, UPDATE,
REFER, MESSAGE
Content-Type: application/sdp
Content-Length: (...)
v=0
o=- 2987933615 2987933615 IN IP6 5555::aaa:bbb:ccc:ddd
s=-
c=IN IP6 5555::aaa:bbb:ccc:ddd
t=0 0
m=audio 3456 RTP/AVP 97 96
b=AS:25.4
a=curr:qos local none
a=curr:qos remote none
a=des:qos mandatory local sendrecv
a=des:qos none remote sendrecv
a=rtpmap:97 AMR
a=fmtp:97 mode-set-0,2,5,7; mode-change-period=2
a=rtpmap:96 telephone-event
a=maxptime:20
```

For details of IMS session establishment, refer to TS 23.228 and TS 24.229.

As the IMS session has been established, the UE may be able to exchange media with the peer of the session. For example, when the UE initiates a voice call and an IMS session is created with a peer UE, the UE is able to exchange voice with the peer UE. When the session is created, the voice media (or audio media) are transmitted/received at the IP address set in the SDP part.

In step S1509, the SMF determines to configure a new PSA for the IMS PDU session. The determination may be made for various reasons, for example, movement of the UE, detection of a new IP flow, or the like.

In step S1510, the SMF determines to add a PSA by multi-homing and selects UPF #3 as an additional PSA. Then, the SMF performs an operation of configuring UPF #1 as a branching point. With this regard, see clause 4.3.5.2a of TS 23.502 and FIG. 11.

In step S1511, the SMF indicates to the UE that new IP prefix @ PSA2 is available, which means that the SMF transmits an IPv6 Router Advertisement message to the UE via the UPF. The UE acquires a new IP address. As described before, the NAS layer of the UE provides the IMS layer with information indicating that this IP address is for media/IMS services (or for media/IMS services routing). This information may be provided along with the new IP address to the IMS layer.

The UE checks whether to perform IMS registration, using the acquired new IP address. As the UE receives the information indicating that the new IP address is for media/IMS services from the lower layer, the UE determines to skip IMS registration. As the conditions described in relation to step S1505, particularly item 8 is not satisfied, the UE may determine to skip IMS registration. The IMS may be used for various types of media/content (e.g., virtual reality/augmented reality (VR/AR)) as well as voice, and the conditions to be checked for making a decision as to whether IMS registration is to be performed, described in relation to step S1505 may be appropriately modified and extended.

In steps S1512 and S1513, the UE transmits an SIP INVITE message to the P-CSCF, to initiate an IMS session.

Upon receipt of the SIP INVITE message, the IMS performs a session setup with the peer UE of the IMS session. As the UE receives an SIP 200 OK message, the IMS session is established. An exemplary SIP INVITE message that the UE transmits to the P-CSCF is given below. The UE uses the IP address acquired in step S1504 as an IP address for SIP signaling exchange (an IP address in Via and the Contact header field, which is 5555::aaa:bbb:ccc:ddd in the example of Table 9) and uses the IP address acquired in step S1511 as an IP address for IMS media exchange (an IP address in an SDP part, that is, an IP address under the Content-Length header field, which is 5555::eee:fff:ggg:hhh in the following example).

TABLE 9

```
INVITE tel:+1-212-555-2222 SIP/2.0
Via: SIP/2.0/UDP [5555::aaa:bbb:ccc:ddd]:1357;comp=sigcomp;
branch=z9hG4bKna2hds7
Max-Forwards: 70
Route: <sip:pcscf1.visited1-net:7531;lr;comp=sigcomp>,
<sip:scsof1.home1.net;lr>
P-Preferred-Identity: "John Doe" <sip:
user1_public1@home2.net>
P-Access-Network-Info: 3GPP-NR-FDD; utran-cell-id-3gpp=
234151D0FCE11
Privacy: none
From: <sip:user2_public1@home1.net>;taq=171828
To: <tel:+1-212-555-2222>
Call-ID: cb03a0s09a2sdfglkj490333
Cseq: 127 INVITE
Require: precondition, sec agree
Proxy-Require: sec-agree
Supported: 100rel
Security-Verify: ipsec-3gpp; q=0.1; alg=hmac-sha-1-96;
spi-c=98765432; spi-s=87654321; port-c=8642; port-s=7531
Contact: <sip:[5555::aaa:bbb:ccc:ddd]:1357;comp=sigcomp>
Allow: INVITE, ACK, CANCEL, BYE, PRACK, UPDATE,
REFER, MESSAGE
Content-Type: application/sdp
Content-Length: (...)
v=0
o=- 2987933615 2987933615 IN IP6 5555::eee:fff:ggg:hhh
s=-
c-IN IP6 5555::eee:fff:ggg:hhh
t=0 0
m=video 3400 RTP/AVP 98 99
b=AS:75
a=curr:qos local none
a=curr:qos remote none
a=des:qos mandatory local sendrecv
a=des:qos none remote sendrev
a=rtPmaP:98 H263
a=fmtp:98 profile-level-id=0
a=rtpmap:99 MP4V-ES
```

That is, the UE continuously uses the IP address acquired during the IMS PDU session establishment in SIP signaling transmission/reception to create the IMS session, whereas the UE uses the acquired new IP address to transmit/receive media. In FIG. 15, the UPFs through which SIP signaling is transmitted in steps S1505 to S1508 and steps S1512 and S1513 are marked. As noted, the SIP signaling is transmitted equally through UPF #1 and UPF #2 irrespective of the UE's acquisition of the new IP address in step S1511.

Table 10 to Table 13 are documents submitted by the inventor of the present disclosure in relation to the above description. The part subsequent to "2. Proposal" is an embodiment proposed in the present disclosure. Figure 1, Figure 2, Figure 4.3.5.4-1, and Figure 6.Y.1-1 mentioned in Table 10 are illustrated as FIGS. 16, 17, 18, and 19, respectively.

TABLE 10

SA WG2 Meeting #126 S2-18xxxx
February 26-March 2, 2018, Montreal, Canada (revision of S2-18xxxx)
Source: LG Electronics
Title: Solution to key issue#1
Document for: Approval
Agenda Item: 6.14
Work Item Release: FS_eIMS5G/Rel-16
Abstract of the contribution: This paper proposes a solution to key
issue#1 in TR 23.794.
1. Discussion
We propose a solution to key issue#1 captured in TR 23.794 in the
previous meeting as below.
5.1 Key Issue 1: Routing of IMS traffic via a localized UPF
The 5GC enables traffic to route via localized UPF close to the edge of
   the network (in some cases adjacent to the RAN nodes). Some IMS services may be able
   to benefit from the lower latency and/or lower back-haul requirements that such
   deployments can enable, however current IMS applications and services are not able to
   leverage these capabilities. This key issue investigates the interactions required
   to leverage localized routing of IMS media and signalling traffic, the changes
   to enable effective control and management of such routing, and impacts of
   mobility and roaming.
EXAMPLE 1: Use Case A:
   Routing of IMS traffic (e.g. video) between two (or more) users using an efficient
   UP path.
EXAMPLE 2: Use Case B:
   A "best effort video service" where the IMS video traffic from UE is offloaded at a
   UPF closer to the UE to minimize the backhaul resource usage based on a decision
   by the IMS.
The following is a partial list of the issues to be addressed:
   How can the IMS network influence or control how the 5GC selects the UP path?
   Which IMS node interacts with the 5GC (i.e. IMS AS, CSCF, or other IMS node)?
   How does an application server request traffic to route using a local UPF?
   How does IMS request traffic to route using (or prevent routing using) a local UPF?
   How is the mobility of the UE considered, and how is service continuity ensured?
   If the UE is roaming, how can the localized routing be extended into the vPLMN
   (if supported)?
   What are the impacts on billing and charging?
To enable routing of IMS traffic via a localized UPF, "Single PDU
   Session with multiple PDU Session Anchors" can be used as described
   in clause 5.6.4 of TS 23.501. FIG. 1 and FIG. 2 show traffic routing via
   localized UPF by using an Uplink Classifier (UL CL) for a PDU Session
   and IPv6 multi-homing for a PDU Session, respectively.
This localized routing can be achieved by the procedure defined in clause
   4.3.5.4 of TS 23.502 below.
UL CL based PSA addition has no UE impact as described in clause
   5.6.4.2 'Usage of an UL Classifier for a PDU Session' of TS 23.501
   while multi-homing based PSA addition has UE impact as described in
   steps 7 and 8 below.
When the UE acquires the new IP prefix due to multi-homing based PSA
   addition to the PDU Session for IMS, how the upper layer of the UE (i.e.
   IMS layer) can use the new IPv6 should be defined. In particular, the
   UE does not have to perform IMS registration by using the new IPv6
   address which means the new IPv6 address is used for IMS traffic
   routing via a localized UPF and not used for SIP signalling.

TABLE 11

In order to make the IMS layer's behaviour clear, it is proposed to get the NAS layer of the UE provide an indication that the new IPv6 address is only for IMS traffic to the IMS layer when the UE has acquired the new IP prefix due to multi-homing based PSA addition to the PDU Session for IMS.
4.3.5.4 Addition of additional PDU Session Anchor and Branching Point or UL CL
Clause 4.3.5.4 describes a procedure to add a PDU Session Anchor and a Branching Point or UL CL for an established PDU Session.
1. UE has an established PDU Session with a UPF including the PDU Session Anchor 1 (PSA1 in FIG. 4.3.5.4-1). The PDU Session User Plane involves at least the RAN and the PDU Session Anchor 1.
2. At some point the SMF decides to establish a new PDU Session Anchor e.g. due to UE mobility, new flow detection. The SMF selects a UPF and using N4 establish the new PDU Session Anchor 2 (PSA2 in FIG. 4.3.5.4-1) of the PDU Session. In case of IPv6 multi-homing PDU Session the SMF also allocates a new IPv6 prefix corresponding to PSA2, and if the PCF has subscribed to the IP allocation/release event, the SMF invokes Nsmf_EventExposure_Notify operation (see clause 5.2.5.5.3) to provide the new allocatedIPv6 prefix to the PCF.
3. The SMF selects a UPF and using N4 establish the Branching Point (in case of IPv6 multi-homing) or a UL CL for the PDU Session. It provides the necessary uplink forwarding rules towards PSA1 and PSA2 including the PSA1 CN Tunnel Info and the PSA2 CN Tunnel InfoIn addition, the AN Tunnel Info is provided for downlink forwarding. In case of IPv6? multi-homing, the SMF also provides traffic filters for the IPv6 prefixes corresponding to PSA1 and PSA2 indicating what traffic shall be forwarded towards PSA1 and PSA2 respectively. In case of UL CL, the SMF provides traffic filters indicating what traffic shall be forwarded towards PSA1 and PSA2 respectively.
NOTE 1: In case the Branching Point or UL CL and the PSA2 are co-located in a single UPF then steps 2 and 3 can be merged. In case a Branching Point is already allocated, step 3 is skipped.

TABLE 11-continued

| | |
|---|---|
| 4. | The SMF updates the PSA1 via N4. It provides the Branching Point or UL CL CN Tunnel Info for the downlink traffic. |
| NOTE 2: | In case the Branching Point or UL CL and the PSA1 are co-located in a single UPF then steps 3 and 4 can be merged. |
| 5. | The SMF updates PSA2 via N4. It provides the Branching Point or UL CL CN Tunnel Info for down-link traffic. |
| NOTE 3: | In case the Branching Point or UL CL and the PSA2 are co-located in a single UPF then step 5 is not needed. |
| 6. | The SMF updates (R)AN via N2 SM information over N11. It provides the new CN Tunnel Info corresponding to the UPF (Branching Point or UL CL). In case of UL CL, if there is an existing UPF between the (R)AN and new inserted UL CL, the SMF updates the existing UPF via N4 instead of updating the (R)AN. |
| 7. | In case of IPv6 multi homing the SMF notifies the UE of the availability of the new IP prefix, @ PSA2. This is performed using an IPv6 Router Advertisement message (RFC 4861 [6]). Also, the SMF sends routing rule along with the IPv6 prefix to the UE using an IPv6 Router Advertisement message (RFC 4191 [21]) as described in TS 23.501 [2] clause 5.8.1 2. |
| 8. | In case of IPv6 multi homing the SMF may re-configure the UE for the original IP prefix @ PSA1, i.e. SMF sends routing rule along with the IPv6 prefix to the UE using an IPv6 Router Advertisement message (RFC 4191 [21]) as described in TS 23.501 [2] clause 5.8.1.2. |

TABLE 12

2. Proposal
The following changes are proposed in TR 23.794.
6.Y    Solution #Y: Multi homing based PSA addition to the PDU Session for IMS for localized routing
6.Y.1    Description
This solution corresponds to the Key issue 1 "Routing of IMS traffic via a localized UPF".
To enable routing of IMS traffic via localized UPF, "Single PDU Session with multiple PDU Session Anchors (PSAs)" can be used as described in clause 5.6.4 of TS 23.501 [3]. This localized routing can be achieved by the procedure defined in clause 4.3.5.4 of TS 23.502 [4]. Uplink Classifier (UL CL) based PSA addition has no UE impact while multi-homing based PSA addition has UE impact as described in steps 7 and 8 in FIG. 4.3.5.4-1: Addition of additional PDU Session Anchor and Branching Point or UL CL of TS 23.502 [4].
When the UE acquires the new IP prefix due to multi-homing based PSA addition to the PDU Session for IMS, how the upper layer of the UE (i.e. IMS layer) can use the new IPv6 address should be defined. In particular, the UE does not have to perform IMS registration by using the new IPv6 address which means the new IPv6 address is used for IMS traffic routing via a localized UPF and not used for SIP signalling.
In order to make the IMS layer's behaviour clear, it is proposed to get the NAS layer of the UE provide an indication that the new IPv6 address is only for IMS traffic to the IMS layer when the UE has acquired the new IP prefix due to multi-homing based PSA addition to the PDU Session for IMS.
FIG. 6.Y.1-1 is same as FIG. 4.3.5.4-1. Addition of additional PDU Session Anchor and Branching Point or UL CL of TS 23.502 [4] and only step 7 has addition for the proposed solution.
FIG. 6.Y.1-1. Multi-homing based PSA addition to the PDU Session for IMS for localized routing
For the proposed solution, step 7 has the following addition:
   The NAS layer of the UE provides the upper layer (i e. IMS layer) with an indication that the new IPv6 address is only for IMS traffic.
6.Y.2    Impacts on existing nodes and functions
UE:
   The NAS layer of the UE provides the upper layer (i.e. IMS layer) with an indication that the new IPv6 address is only for IMS traffic when the UE has acquired the new IP prefix due to multi-homing based PSA addition to the PDU Session for IMS. When the IMS layer of the UE receives the indication that the new IPv6 address is only for IMS traffic from the NAS layer, the UE does not perform IMS registration by using the new IPv6 address

TABLE 12-continued

Core network:
   No impact.
IMS network:
   No impact.
6.Y.3    Solution Evaluation
Editor's note: This clause provides an evaluation of the solution.

In the case of multi-homing-based BP addition for a PDU session, the SMF may operate as follows. The SMF may operate according to one of A) and B) in relation to provisioning of P-CSCF address information.

A) The SMF may not provide P-CSCF address information to the UE. The SMF may not provide P-CSCF address information to the UE unconditionally or based on one or more of information stored in the SMF (e.g., which indicates that a P-CSCF address has been provided during previous IMS PDU session establishment), configuration information for the SMF (e.g., if the P-CSCF address has been provided during the previous IMS PDU session establishment, the SMF is configured not to additionally provide the P-CSCF address), information indicating the absence of the P-CSCF address information in the SMF, and information indicating that a UPF available for an IMS PDU session to the SMF is not connected to the P-CSCF/IMS.

B) The SMF provides the P-CSCF address information to the UE. In this case, the SMF may provide the P-CSCF address information to the UE by a NAS message or by using a router advertisement mechanism when/before/after a new IP prefix is provided. The SMF may provide the P-CSCF address information to the UE unconditionally or based on one or more of configuration information for the SMF (e.g., the SMF is configured to additionally provide the P-CSCF address), information indicating the presence of the P-CSCF address information in the SMF, and information indicating that a UPF available for an IMS PDU session to the SMF is connected to the P-CSCF/IMS.

In relation to whether the UE is to perform IMS registration, one of the information of a) and the information of b) may be provided explicitly or implicitly.

a) The SMF indicates the UE to skip IMS registration. The indication information may be interpreted as indicating that new IP address information is not for IMS registration. The indication information may explicitly or implicitly indicate that in the case of multi-homing-based BP addition, there is no need for performing IMS registration. In this case, the indication information may be provided to the UE, when a PDU session is established or initial IP address information is allocated to the UE. This operation is performed unconditionally or performed based on one or more of information stored in the SMF (e.g., which indicates that a P-CSCF address has been provided during previous IMS PDU session establishment), configuration information for the SMF (e.g., if the P-CSCF address has been provided during the previous IMS PDU session establishment, the SMF is configured not to additionally provide the P-CSCF address), information indicating the absence of the P-CSCF address information in the SMF, and information indicating that a UPF available to the SMF, for an IMS PDU session is not connected to the P-CSCF/IMS.

b) The SMF indicates the UE to perform IMS registration by using a new allocated IP address (which may be an IP address generated based on a new IP prefix). The indication information may be interpreted as indicating that the new IP address information is for IMS registration. The indication information may explicitly or implicitly indicate that in the case of multi-homing-based BP addition, there is a need for performing IMS registration. In this case, the indication information may be provided to the UE, when a PDU session is established or initial IP address information is allocated to the UE. This operation is performed unconditionally or performed based on one or more of configuration information for the SMF (e.g., the SMF is configured to additionally provide the P-CSCF address), information indicating the presence of the P-CSCF address information in the SMF, and information indicating that a UPF available to the SMF, for an IMS PDU session is connected to the P-CSCF/IMS.

The information of a) and the information of b) may be provided in various manners. For example, the information of a) and the information of b) may be provided by a NAS message, a router advertisement mechanism when/before/after a new IP prefix is provided, or a router advertisement mechanism to provide a valid duration during which this information is valid for an old IP prefix. Further, the information of a) or the information of b) may preconfigured for the UE.

The SMF may enable the UE to operate according to a) without providing a) by operating according to A). Alternatively, the SMF may enable the UE to operate according to b) without providing b) by operating according to B). Because a) and b) are not provided to the UE, the UE may determine to skip IMS registration, using new IP address information even though the UE receives the new IP address information. On the contrary, Because a) and b) are not provided to the UE, the UE may determine to perform IMS registration by using new IP address information, upon receipt of the new IP address information.

The SMF may enable the UE to operate according to b) by providing quality of service (QoS) information for SIP signaling to the UE. To allow the UE to perform IMS registration with respect to a new IP address through a new P-CSCF, the network (e.g., SMF) provides QoS information for SIP signaling to the UE and sets QoS to enable a branched PDU session configured with a new PSA to process SIP signaling.

When the UE needs to perform IMS registration, using the new allocated IP address, information indicating a registration method may be provided in one of the following manners.

i) It may be indicated that while previous IMS registration is maintained, IMS registration is to be performed additionally. This may result in maintaining multiple IMS registrations. While multiple IMS registrations are allowed conventionally for different RAT/access types, multiple IMS registrations are performed despite the same RAT/access type in the present disclosure. Herein, the RAT/Access type may be any of NR, E-UTRAN, WLAN, Non-3GPP, and so on. Further, it may be defined separately or implicitly that the core network is a 5G core network. During IMS registration, the RAT/access type may be provided to the IMS network. This is applied throughout the present disclosure.

ii) It may be indicated that IMS registration for adding an IP address is to be performed in addition to previous IMS registration. The indication is intended to indicate that a new IP address (i.e., a new contact) has been added to the existing IMS registration for a certain RAT/access type. Compared to i), the idea of ii) is that a new IP address is added to one IMS registration context existing for an existing RAT/access type, rather than IMS registration is maintained in a plurality of contexts for the same RAT/access type.

iii) It may be indicated that IMS registration is to be performed, with previous IMS registration not maintained. This implies that only one IMS registration is maintained for one RAT/access type.

When the UE is aware that an old IP address is to be released due to a new IP address (based on a timer provided by the SMF or a timer set in the UE) or an old PDU session is to be released due to a new PDU session (based on a timer provided by the SMF or a timer set in the UE), the UE may determine to operate according to iii) even though the UE does not receive the information of i) to iii).

Even though a PDU session established by the UE is a PDU session for IMS and thus DNN is identically IMS (the DNN may be interpreted as well-known IMS DNN), the added IMS PDU session has a different S-NSSAI from that of the old IMS PDU session. Therefore the UE may determine to operate according to i), even though the UE fails to receive the information of i) to iii).

When the UE operates according to i) or ii), which IMS registration (or which contact: this is IP address information used for IMS registration by the UE) is main (or primary) IMS registration may be indicated by the network (e.g., an IMS function such as an SMF, an S-CSCF, or an IMS application server) or configured in the UE (e.g., the oldest IMS registration, the latest IMS registration, IMS registration for which IP address information allocated before multi-homing-based BP addition is used, or IMS registration for which IP address information allocated along with multi-homing-based BP addition is used).

Even in the case of multi-homing-based PSA addition, the UE may perform IMS registration, which will be described below. The operation of performing IMS registration, using a new allocated IP address at the UE may be based on information received from the SMF and/or information configured for the UE (e.g., the UE is configured to skip IMS registration when the UE is additionally allocated an IP address due to multi-homing-based BP addition) and/or information received from any other network function (e.g., an AMF, a policy-related function, or an IMS node) than the SMF.

The UE performs IMS registration, using the allocated new IP address. Herein, the UE may operate according to one of the following i), ii), and iii). When the new IP address is assigned to the UE, the NAS layer of the UE transmits the new IP address to the IMS layer (the upper layer from the viewpoint of the NAS layer). The NAS layer of the UE may also provide the IMS layer with information indicating that this IP address is for IMS registration (or IMS registration is to be performed with the new IP address), information indicating that the new IP address is for SIP/IMS signaling (or this IP address is to be used for SIP/IMS signaling routing), information indicating that this IP address is for media/IMS services (or for media/IMS services routing), information indicating that this IP address is to be used for both IMS registration and media/IMS services, and information indicating that this IP address is to be used for both SIP/IMS signaling and media/IMS services. However, even though the NAS layer of the UE does not provide the above information to the IMS layer, the IMS layer of the UE may consider that the IP address received from the NAS layer (the lower layer from the viewpoint of the IMS layer) is used for all IMS-related operations.

i) Additional IMS registration is performed, with old IMS registration maintained. In the manner described in i) of information indicating the registration method using a new allocated IP address that the SMF provides to the UE, the IMS network (mainly, the S-CSCF of the UE) manages an IMS registration-related context of the UE as described in i).

ii) IMS registration for adding an IP address is performed in addition to the old IMS registration. In the manner described in ii) of information indicating the registration method using a new allocated IP address that the SMF provides to the UE, the IMS network (mainly, the S-CSCF of the UE) manages an IMS registration-related context of the UE as described in ii).

iii) IMS registration is performed with the old IMS registration not maintained. In the manner described in iii) of information indicating the registration method using a new allocated IP address that the SMF provides to the UE, the IMS network (mainly, the S-CSCF of the UE) manages an IMS registration-related context of the UE as described in iii).

When the UE receives P-CSCF address information from the network during the above-described IMS registration, the UE performs IMS registration via this P-CSCF. When the UE does not receive the P-CSCF address information during the above-described IMS registration, the UE performs IMS registration via an old P-CSCF (based on P-CSCF address information received during establishment of the PDU session).

When the UE performs IMS registration, the UE may provide characteristics related to a PSA added by multi-homing. The characteristics may be information indicating that the PSA is a local one or a central one.

After the multi-homing-based BP (and/or PSA) addition for a PDU session, the UE operates according to [A], [B] or [C].

[A] When the UE has performed IMS registration, using a new IP address according to i) or ii), the UE has registered multiple contacts (=IP addresses) to the IMS network, for the same RAT/access type. Therefore, rule or filter information (which may be referred to as a routing rule/filter or a steering rule/filter) is needed, by which the following is to be determined: an SIP method and/or a medium and/or an IMS service and/or a destination IP address (an IP address with which the UE establishes an IMS session or exchanges media), and/or a transport protocol (TCB, UDP, or the like), and/or a transport port number (a source port number, a destination port number, or both), and/or I) a contact to be used for transmitting an SIP request, and/or II) a contact to be used for receiving an SIP request.

The rule/filter information may be preconfigured in the UE, received from the network (e.g., the SMF) at the time of the multi-homing-based BP addition, or received from the IMS (e.g., S-CSCF) during IMS registration. Apart from the above-described rule/filter information, various pieces of information may be used for I) and II).

The SIP method represents SIP INVITE, SIP MESSAGE, SIP REFER, and so on (all of these may be SIP methods), and the media represents voice, video, or the like (this may be any of all media types included in the legacy SDP). The IMS service may be a service identified by an IMS communication service identifier (ICSI), or in any other manner (voice call, video call, SMS, or the like).

The information of I) may be used when the UE transmits an SIP request, and the information of II) may be used when the IMS network transmits an SIP request directed to the UE. If the IMS network transmits the SIP request directed to the UE towards all registered contacts (SIP forking), the UE may transmit an SIP response via a contact corresponding to the SIP request based on the information of I).

In relation to I) and II), the SIP request/response may be allowed to be transmitted only via one contact (configurable as the first registered contact, the last registered contact, a contact being a central PSA, or the like) among a plurality of contacts registered to the IMS network. Therefore, a first contact may be used for transmission of the SIP request/response, whereas a second contact may be used for actual media transmission. Obviously, the first contact may be used for both of SIP request/response transmission and media transmission.

[B] When the UE has skipped IMS registration, the SIP request/response may be transmitted via the first registered contact, and actual media may be transmitted via a contact registered after the first registered contact as well as the first registered contact. In the rule/filter information described in [A], a rule/filter except for the rule/filter related to an SIP method may be configured in or provided to the UE as described in [A]. The SIP method-related rule/filter information may also be configured in or provided to the UE such that the SIP request/response is transmitted via the first registered contact. Alternatively, in this case, the SIP request/response may be transmitted via the first registered contact, and the actual media may be transmitted via a contact registered after the first registered contact. As described in [A], rule/filter information indicating the contacts may be configured in or provided to the UE.

[C] The UE may perform IMS registration, using a new IP address as in iii). In this case, the UE has one SIP connection (which may be interpreted as a Gm connection) to the IMS network, for one RAT/access type, and operates conventionally.

When the old IMS registration is not maintained but its IP address may still be used, such rule/filter information as described in relation to media and IMS services in [A] may be configured in or provided to the UE.

Multi-Homing-Based PSA Removal

When the UE has performed IMS registration, using an allocated new IP address and operated according to i) or ii), the UE deregisters a suspended IP address from the IMS network. The IMS network then removes the IP address among contacts for a corresponding RAT/access type.

When the UE has performed IMS registration, using a new allocated IP address and operated according to iii), the UE performs IMS registration, using a continuously available IP address (i.e., an IP address to a PSA other than a removed PSA). Herein, the IMS registration means IMS registration which replaces an old contact for the RAT/access type.

After a BP (and/or a PSA) is removed from the PDU session, the UE may operate as follows.

When the UE performs IMS registration, a method of providing/applying a ruler/filter in relation to determination of an IP address to which the UE is to transmit SIP signaling and media after a BP is added by multi-homing for a PDU session, that is, an IP address is added for the UE has been described above.

On the other hand, when an IP address of the UE is suspended (or deleted) due to removal of a BP from the PDU session, a rule/filter is needed, which determines an IP address to which the UE transmits SIP signaling, media, and IMS service. When there is one remaining IP address after the IP address is suspended, all of SIP signaling, media, and IMS services may be transmitted via the remaining IP address, and a related rule/filter may be preconfigured in the UE, received from the network (e.g., SMF) at the time of the BP removal, or received from the IMS (e.g., S-CSCF) at the time of IMS deregistration.

When there are multiple available IP addresses despite the BP removal, a rule/filter should be set to determine an IP address to which the UE is to transmit SIP signaling, media, and IMS services. The foregoing description of the case in which the UE performs registration may be applied.

The SIP request/response and the SIP method may be interpreted as SIP signaling. A PDU session may be interpreted as a PDU session with a DNN set to IMS (or well-known IMS or for IMS or connectable to an IMS network). When the concept of slicing is used, the PDU session may be interpreted as a PDU session which has a DNN set to IMS and is distinguishable by an S-NSSAI. For example, if S-NSSAI #1=slice #1 and S-NSSAI #2=slice #2, an IMS PDU session may be generated in both a slice corresponding to slice #1 and a slice corresponding to slice #2. The PDU sessions generated in the different slices may be regarded as different PDU sessions although they are the IMS PDU session. Herein, it may be considered that allocation of an additional IP address takes place within the same PDU session.

Figure 20:
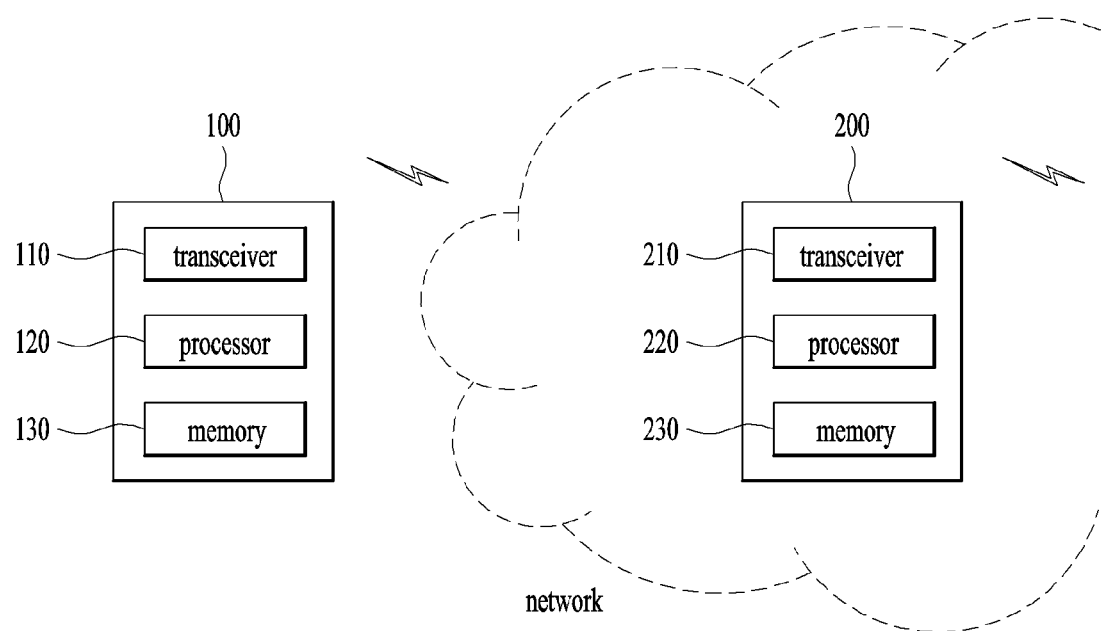
FIG. 20 is a block diagram of a node device according to an embodiment of the present disclosure.

FIG. 20 is a block diagram of a preferred embodiment of a UE and a network node according to an example of the present disclosure.

Referring to FIG. 20, a UE 100 according to the present disclosure may include a transceiver 110, a processor 120, and a memory 130. The transceiver 110 may transmit and receive various signals, data, and information to and from an external device. The UE 100 may be connected to the external device wiredly and/or wirelessly. The processor 120 may provide overall control to the UE 100, and may be configured to compute and process information to be transmitted to the external device or information received from the external device by the UE 100. The memory 130 may store the computed and processed information for a predetermined time, and may be replaced by a component such as a buffer (not shown). Further, the processor 120 may be configured to perform a UE operation proposed by the present disclosure. Specifically, the processor 120 may establish a PDU session with a first PSA, receive a new IP address from an SMF, and when the received new IP address is related to multi-homing-based PSA addition, skip IMS registration using the new IP address.

Referring to FIG. 20, a network node 200 according to the present disclosure may include a transceiver 210, a processor 220, and a memory 230. The transceiver 210 may transmit and receive various signals, data, and information to and from an external device. The network node 200 may be connected to the external device wiredly and/or wirelessly. The processor 220 may provide overall control to the network node 200 and may be configured to compute and process information to be transmitted to the external device or information received from the external device by the network node 200. The memory 230 may store the computed and processed information for a predetermined time, and may be replaced by a component such as a buffer (not shown). Further, the processor 220 may be configured to perform a network node operation proposed by the present disclosure.

The specific configurations of the UE 100 and the network device 200 may be implemented such that the details described in the various embodiments of the present disclosure may be applied independently or implemented such that two or more of the embodiments are applied at the same time. For clarity, a redundant description is omitted.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described in the context of a 3GPP system, the embodiments are applicable in the same manner to various mobile communication systems.

The invention claimed is:

1. A method of receiving signals in relation to multi-homing-based protocol data unit session anchor (PSA) addition by a user equipment (UE) in a wireless communication system, the method comprising:
   establishing, by the UE, a protocol data unit (PDU) session with a first PSA;
   receiving, by the UE from a session management function (SMF), a new Internet protocol (IP) address; and
   receiving information informing that the new IP address is related to a multi-homing-based PSA addition,
   wherein, based on the received information informing that the new IP address is related to the multi-homing-based PSA addition:
   an IP multimedia subsystem (IMS) registration using the new IP address is skipped; and
   a non-access stratum (NAS) layer of the UE provides an upper layer with information indicating that the new IP address is for IMS media routing.

2. The method according to claim 1, wherein based on that the received new IP address is related to the multi-homing-based PSA addition, the new IP address is used for IMS media routing to an added second PSA.

3. The method according to claim 1, wherein based on that the received new IP address is related to the multi-homing-based PSA addition, the NAS layer of the UE provides the upper layer with information indicating that the new IP address is only for IMS media.

4. The method according to claim 1, wherein the new IP address is a new IP version 6 (IPv6) prefix.

5. The method according to claim 1, wherein the upper layer is an IMS layer.

6. The method according to claim 2, wherein the second PSA is a localized user plane function (UPF).

7. The method according to claim 1, wherein the first PSA is a user plane function (UPF).

8. A user equipment (UE) for transmitting and receiving signals in relation to multi-homing-based protocol data unit session anchor (PSA) addition in a wireless communication system, the UE comprising:
a memory;
a transceiver; and
at least one processor operatively coupled to the memory and the transceiver,
wherein the at least one processor is configured to:
establish a protocol data unit (PDU) session with a first PSA;
control the transceiver to receive, from a session management function (SMF), a new Internet protocol (IP) address; and
control the transceiver to receive information informing that the new IP address is related to a multi-homing-based PSA addition, wherein, based on the received information informing that the new IP address is related to the multi-homing-based PSA addition:
an IP multimedia subsystem (IMS) registration using the new IP address is skipped; and
a non-access stratum (NAS) layer of the UE provides an upper layer with information indicating that the new IP address is for IMS media routing.

9. The UE according to claim 8, wherein based on that the received new IP address is related to the multi-homing-based PSA addition, the new IP address is used for IMS media routing to an added second PSA.

10. The UE according to claim 8, wherein based on that the received new IP address is related to the multi-homing-based PSA addition, the NAS layer of the UE provides the upper layer with information indicating that the new IP address is only for IMS media.

\* \* \* \* \*